(12) United States Patent
Nashimoto

(10) Patent No.: US 6,816,660 B2
(45) Date of Patent: Nov. 9, 2004

(54) OPTICAL WAVEGUIDE ELEMENT AND METHOD OF FABRICATION THEREOF

(75) Inventor: Keiichi Nashimoto, Ayase (JP)

(73) Assignee: Nozomi Photonics Co., Ltd., Tokyo (JP)

( * ) Notice: Subject to any disclaimer, the term of this patent is extended or adjusted under 35 U.S.C. 154(b) by 92 days.

(21) Appl. No.: 10/146,062

(22) Filed: May 16, 2002

(65) Prior Publication Data

US 2002/0176679 A1 Nov. 28, 2002

(30) Foreign Application Priority Data

May 22, 2001 (JP) .................................. 2001-152606

(51) Int. Cl.$^7$ .............................. G02B 6/12; G02B 6/30
(52) U.S. Cl. ............................ 385/131; 385/43; 385/49
(58) Field of Search ........................... 385/43, 129–132, 385/49

(56) References Cited

U.S. PATENT DOCUMENTS

| | | | |
|---|---|---|---|
| 5,703,989 A | * 12/1997 | Khan et al. | 385/130 |
| 5,738,798 A | * 4/1998 | Leonard | 216/24 |
| 6,052,397 A | * 4/2000 | Jeon et al. | 372/46 |
| 6,240,233 B1 | * 5/2001 | Weinert et al. | 385/131 |
| 6,483,967 B2 | * 11/2002 | Tang et al. | 385/43 |
| 6,600,847 B2 | * 7/2003 | Saini et al. | 385/14 |

FOREIGN PATENT DOCUMENTS

| | | |
|---|---|---|
| JP | A 5-182948 | 7/1993 |
| JP | A 7-78508 | 3/1995 |
| JP | A 9-61652 | 3/1997 |

OTHER PUBLICATIONS

Nishihara et al., "Optical Integrated Circuits", pp. 195–230, 1993.
Kawachi, "Current Status and Future Trends in Planar Lightware Circuit Technologies", NTT R&D, vol. 43, No. 11, pp. 101–108, 1994.

* cited by examiner

*Primary Examiner*—Akm Enayet Ullah
*Assistant Examiner*—Jerry T Rahll
(74) *Attorney, Agent, or Firm*—Oliff & Berridge, PLC

(57) ABSTRACT

A ridge type channel optical waveguide is formed in an optical waveguide layer. A cladding layer having a refractive index smaller than that of the optical waveguide layer and having a width substantially the same as that of the channel optical waveguide and having a thickness which increases in a tapered manner toward an end surface, is formed above both of a light entering end portion and a light exiting end portion of the channel optical waveguide. By the cladding layer, a mode field diameter in a direction orthogonal to a substrate surface can be enlarged, and a coupling loss with an optical fiber can be greatly reduced. Further, loss due to mode mismatching can be prevented by a light confining effect.

22 Claims, 28 Drawing Sheets

F I G. 14 A
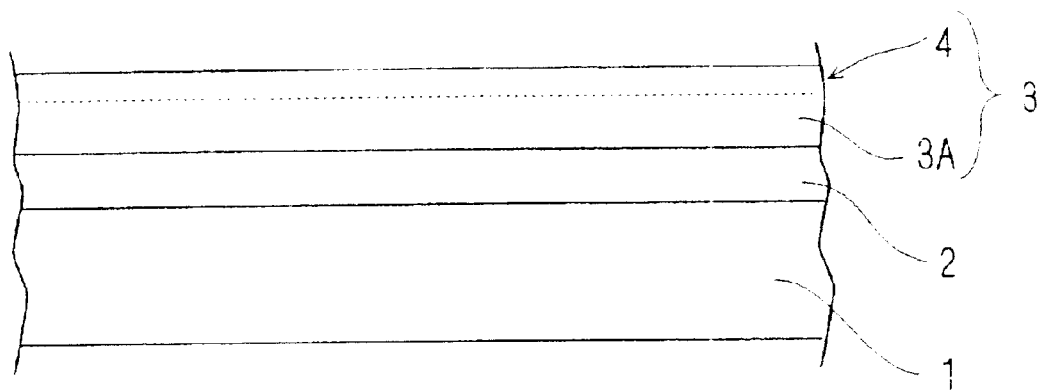
F I G. 14 B
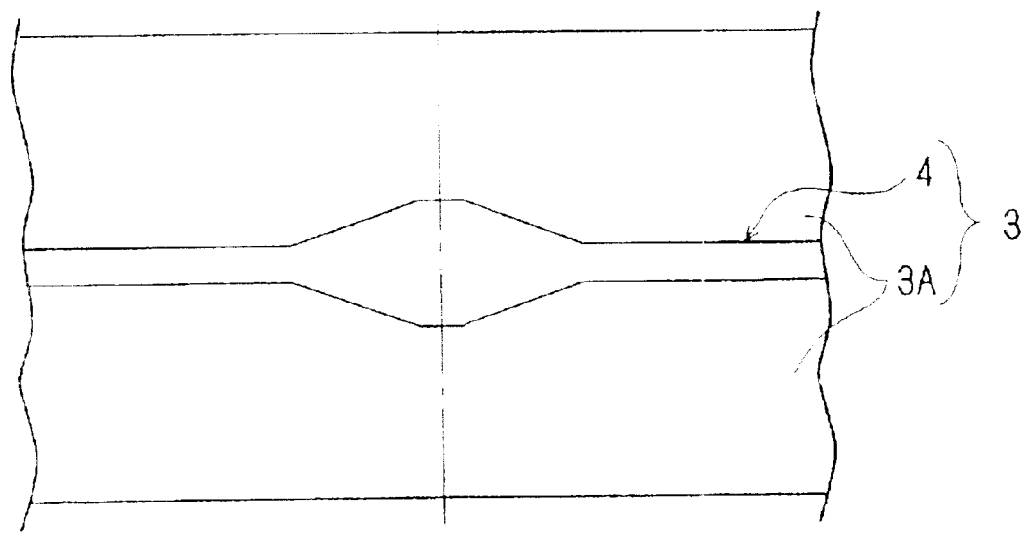

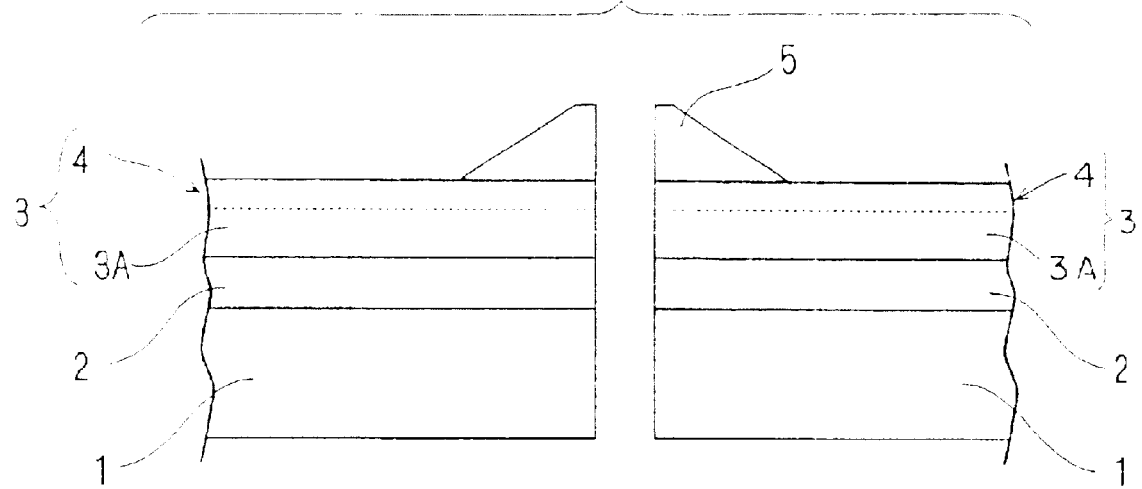
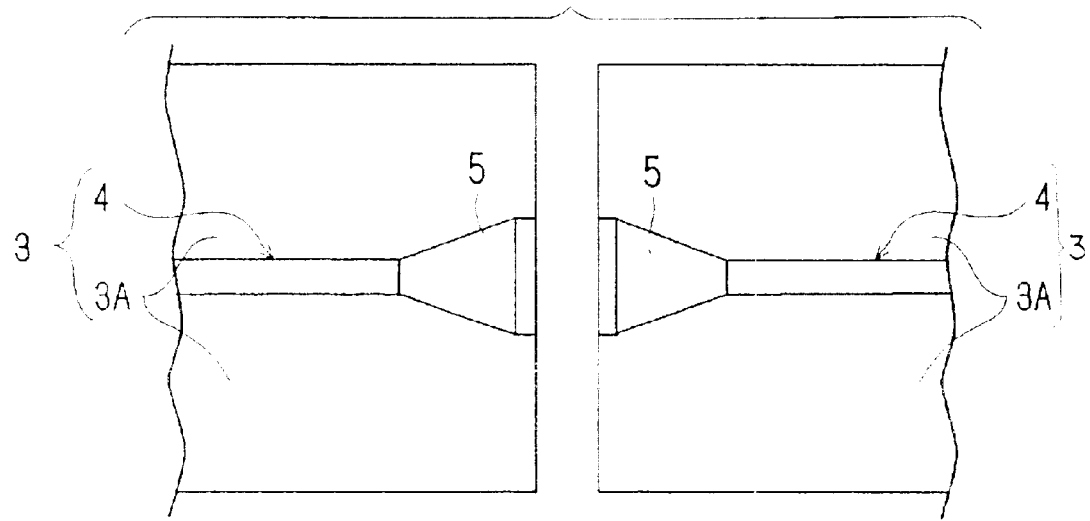

OPTICAL WAVEGUIDE ELEMENT AND METHOD OF FABRICATION THEREOF

BACKGROUND OF THE INVENTION

1. Field of the Invention

The present invention relates to an optical waveguide element and a method of fabricating an optical waveguide element, and in particular, to an optical waveguide element which can be coupled with an optical fiber at a high coupling rate, and to a method of fabricating the optical waveguide element.

2. Description of the Related Art

Conventionally, glass such as quartz, electro-optical materials and oxide ferroelectrics such as $LiNbO_3$, magneto-optical materials such as $Y_3Ga_5O_{12}$, polymers such as PMMA, and GaAs compound semiconductors have been used as materials of planar type optical waveguides. Among these, oxide ferroelectrics are known as exhibiting a particularly good acousto-optical effect and electro-optical effect. However, most acousto-optical elements and electro-optical elements which have been actually fabricated until now utilize $LiNbO_3$ or $LiTaO_3$.

Examples of oxide ferroelectrics are $LiNbO_3$, $BaTiO_3$, $PbTiO_3$, $Pb_{1-x}La_x(Zr_yTi_{1-y})_{1-x/4}O_3$ (called PZT, PLT, PLZT, depending on the values of x and y), $Pb(Mg_{1/3}Nb_{2/3})O_3$, $KNbO_3$, $LiTaO_3$, $Sr_xBa_{1-x}Nb_2O_6$, $Pb_xBa_{1-x}Nb_2O_6$, $Bi_4Ti_3O_{12}$, $Pb_2KNb_5O_{15}$, $K_3Li_2Nb_5O_{15}$, and the like. Most of the materials thereamong have better characteristics than $LiNbO_3$. In particular, $Pb_{1-x}La_x(Zr_yTi_{1-y})_{1-x/4}O_3$ is known as a material having an electro-optical coefficient which is extremely high as compared to that of $LiNbO_3$. The electro-optical coefficient of an $LiNbO_3$ single crystal is 30.9 pm/V, whereas the electro-optical coefficient of a PLZT (8/65/35: x=8%, y=65%, 1-y=35%) ceramic is a large 612 pm/V.

The reason why most elements which are actually fabricated use $LiNbO_3$ or $LiTaO_3$, although there are many ferroelectrics having better characteristics than $LiNbO_3$, is as follows. For $LiNbO_3$ and $LiTaO_3$, techniques for growing single crystals and techniques for forming optical waveguides by Ti diffusion into the wafer or proton exchange are established. In contrast, for materials other than $LiNbO_3$ and $LiTaO_3$, a thin film must be formed by epitaxial growth, and a thin film optical waveguide of a quality which can be used in practice cannot be fabricated by conventional vapor phase growth.

In order to overcome the above-described problems, the inventors of the present invention have proposed (in Japanese Patent Application Laid-Open (JP-A) No. 7-78508) a solid phase epitaxial growth technique in which a thin film optical waveguide of a quality which can be used in practice can be fabricated even by an oxide ferroelectric material. However, with this oxide thin film optical waveguide formed by epitaxial growth, a problem arises in that, due to demands for use of a single mode, demands for lowering the driving voltage and the like, there are many cases in which the film thickness cannot be made thin in comparison with the mode field diameter of the optical fiber, and the loss in coupling the optical waveguide with an optical fiber is great.

Conventionally, with semiconductor optical waveguides and quartz waveguides, techniques have been disclosed in which a taper-shaped optical waveguide is provided at a position of connection with an optical fiber, and the coupling loss of the optical waveguide and the optical fiber is reduced (see JP-A Nos. 9-61652, 5-182948, and the like).

However, there is no technique for fabricating a fine pattern which is good for oxide thin film optical waveguides formed by epitaxial growth, and it is difficult to fabricate an optical waveguide in a taper shape. For example, in $LiNbO_3$ single crystal wafers or the like, a method of fabricating a three-dimensional (channel) optical waveguide and grating, to which Ti scattering and proton exchange techniques are applied, is disclosed in "Hikari Shuuseki Kairo" ("Optical Integrated Circuits"), authored by Nishihara, Haruna, and Suhara, Ohmsha (1993), pp. 195–230. However, for other materials, and for $Pb_{1-x}La_x(Zr_yTi_{1-y})_{1-x/4}O_3$ in particular, methods of scattering other elements therein or ion exchange are unknown. Further, for quartz optical waveguides and the like, a method of fabricating a channel optical waveguide and the like by reactive ion etching is disclosed in Kawachi, "NTT R&D", 43 (1994) 1273, and the like. However, it is difficult to carry out selective etching without causing surface roughening which is a cause of scattering loss at a single crystal type epitaxial ferroelectric thin film optical waveguide, and without causing damage to the substrate or the like which is an oxide of the same type as the thin film optical waveguide. Thus, there are no reported examples of a channel optical waveguide having little loss being fabricated as an epitaxial ferroelectric thin film optical waveguide.

Further, when making an oxide thin film optical waveguide, which is formed by epitaxial growth, into a taper shape, there is the problem that it is difficult to prevent the waveguide mode from becoming a multimode.

SUMMARY OF THE INVENTION

The present invention was developed in order to overcome the above-described problems of the prior art, and an object of the present invention is to provide an optical waveguide element which can be coupled with an optical fiber at a high coupling rate. Further, another object of the present invention is to provide a method of fabricating an optical waveguide element which can precisely fabricate an optical waveguide element which can be coupled with an optical fiber at a high coupling rate.

In order to achieve the above object, an optical waveguide element of the present invention comprises: an optical waveguide layer having a ridge type channel optical waveguide; and a cladding layer provided above at least one of a light entering end portion and a light exiting end portion of the channel optical waveguide of a surface of the optical waveguide layer, the cladding layer having substantially the same width as the channel optical waveguide, and having a refractive index which is smaller than a refractive index of the optical waveguide layer, and having a configuration in which a thickness of the cladding layer increases in a tapered manner toward an end surface.

A method of fabricating an optical waveguide element of the present invention comprises the steps of: (a) forming, on a surface of an optical waveguide layer having a ridge type channel optical waveguide and formed by epitaxial growth, an amorphous thin film whose refractive index after epitaxial growth is smaller than a refractive index of the optical waveguide layer; (b) reshaping the amorphous thin film such that a taper-shaped portion, which has substantially the same width as a width of a channel optical waveguide and has a thickness which increases toward an end surface, remains above at least one of a light entering end portion and a light exiting end portion of the channel optical waveguide; and (c) forming a taper type cladding layer by solid phase epitaxially growing the reshaped amorphous thin film by heating the reshaped amorphous thin film.

Another aspect of the method of fabricating an optical waveguide element of the present invention comprises the steps of: (a) forming, by epitaxial growth and on a surface of a slab type optical waveguide layer formed by epitaxial growth, a slab type cladding layer whose refractive index is smaller than a refractive index of the optical waveguide layer; (b) forming a taper type cladding layer by reshaping the slab type cladding layer such that a taper-shaped portion, which has substantially the same width as a width of a channel optical waveguide and has a thickness which increases toward an end surface, remains above at least one of a light entering end portion and a light exiting end portion at which the channel optical waveguide is to be formed; and (c) forming a ridge type channel optical waveguide by reshaping the slab type optical waveguide layer into a predetermined channel pattern.

In accordance with the optical waveguide element of the present invention, the mode field diameter of the optical waveguide can be enlarged in the direction orthogonal to the substrate surface, and the coupling loss between an optical fiber and the optical waveguide element can be reduced. In particular, because the width of the cladding layer is substantially the same as the width of the channel optical waveguide, the strength of the light confinement in the widthwise direction does not vary drastically at the time when the mode field diameter is enlarged. Generation of loss due to mode mismatching is prevented, and coupling loss with an optical fiber can be greatly reduced.

Further, in the optical waveguide element of the present invention, the thickness of the cladding layer increases in a tapered manner toward the end surface. Thus, the mode field diameter can be increased gradually, and the light propagation loss within the optical waveguide can be reduced.

In a case in which the optical waveguide layer and the cladding layer of the optical waveguide element of the present invention are formed by carrying out patterning while in the state of an amorphous thin film and then solid phase epitaxially growing the patterned amorphous thin film, there is the advantage that it is possible to obtain edges, side walls and surfaces which are extremely smooth and whose light loss due to scattering is small. Further, in a case in which the optical waveguide layer and the cladding layer are formed by patterning thin films which have been solid phase epitaxially grown, there are the advantages that it is possible to obtain an optical waveguide layer and a cladding layer having excellent crystallinity, and that a channel optical waveguide can be formed precisely.

BRIEF DESCRIPTION OF THE DRAWINGS

FIG. 14A is a cross-sectional view, along the light propagating direction, showing a channel optical waveguide forming step in the process of fabricating the optical waveguide element of Example 1.

FIG. 14B is a plan view showing the channel optical waveguide forming step in the process of fabricating the optical waveguide element of Example 1.

FIG. 20A is a cross-sectional view, along the light propagating direction, showing a device isolation step in the process of fabricating the optical waveguide element of Example 1.

FIG. 20B is a plan view showing the device isolation step in the process of fabricating the optical waveguide element of Example 1.

DETAILED DESCRIPTION OF THE PREFERRED EMBODIMENTS

Hereinafter, embodiments of the present invention will be described in detail with reference to the figures.

Structure of Optical Waveguide Element

Figure 1:
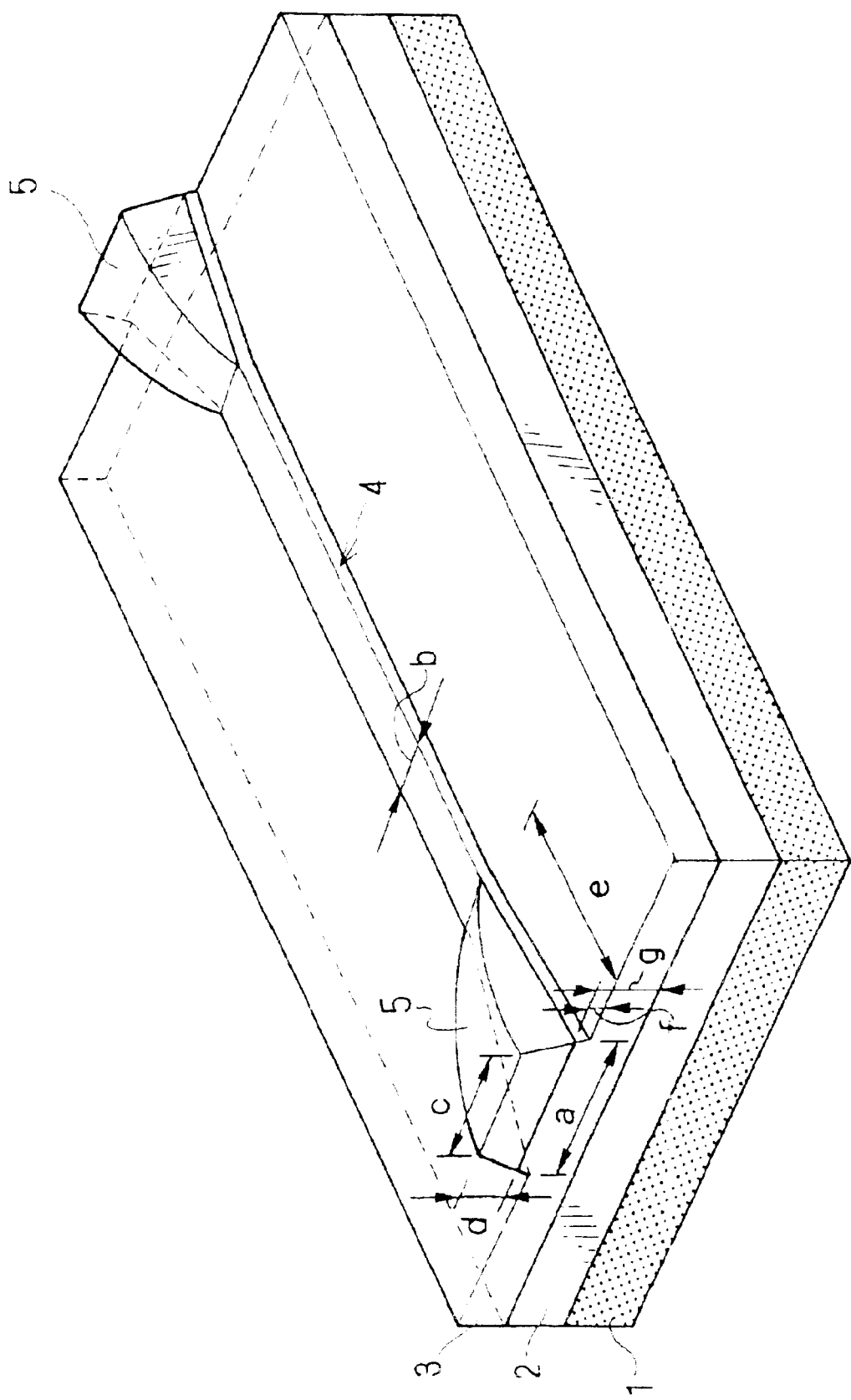
FIG. 1 is a perspective view showing the structure of an optical waveguide element of an embodiment of the present invention.
Figure 2:
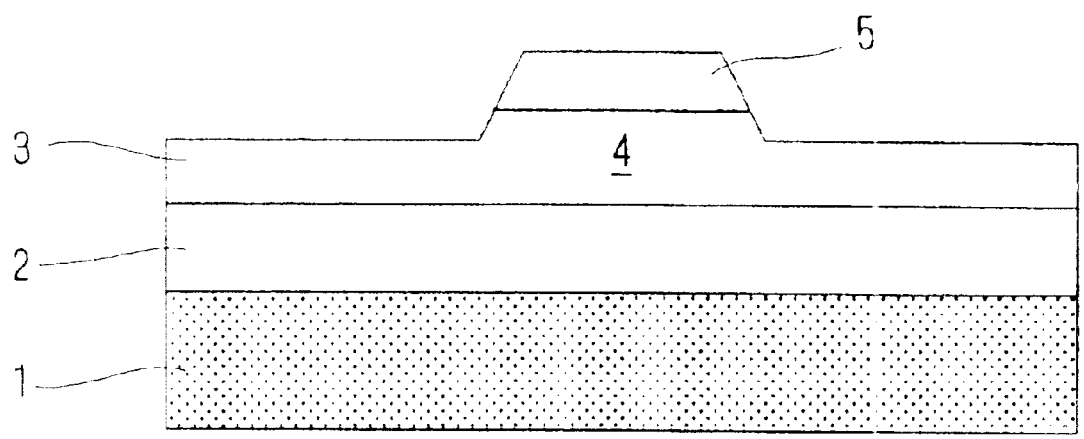
FIG. 2 is a diagram showing the layer structure as seen from an end surface side of the optical waveguide element shown in FIG. 1.

FIG. 1 shows the schematic structure of the optical waveguide element relating to the present embodiment. FIG. 2 shows the layer structure at an end surface side of the optical waveguide element shown in FIG. 1. As shown in FIGS. 1 and 2, the optical waveguide element has a single crystal substrate 1, a buffer layer 2 formed on the single crystal substrate 1, and an optical waveguide layer 3 formed on the buffer layer 2. A ridge-shaped channel optical waveguide 4, which has a predetermined channel height and extends linearly along the longitudinal direction of the single crystal substrate 1, is formed at the optical waveguide layer 3. The width of the channel optical waveguide 4 increases in a tapered manner toward the end surfaces, at both the light entering end portion and the light exiting end portion. When, for example, the channel width of the linear portion of the channel optical waveguide 4 is 5 $\mu$m, the taper portion of the channel optical waveguide 4 may be a taper configuration whose channel width widens from 5 $\mu$m to 8 $\mu$m within a length of 1000 $\mu$m. A linear channel, which is a margin for working, may be connected to the end portion of the taper portion. A cladding layer 5 is formed on each of the light entering end portion and the light exiting end portion of the channel optical waveguide 4. The cladding layer 5 has a refractive index which is smaller than that of the optical waveguide layer 3, has substantially the same width as the channel optical waveguide 4, and has a thickness which increases in a tapered manner toward the end surface.

Optimal values of the channel width and the channel height can be selected in accordance with the switching system such as, for example, a Mach-Zehnder interference switch, a directional coupling switch, a total reflection switch, a Bragg reflection switch, a digital switch or the like, the curvature of the bending channel waveguide, the material of the waveguide, the fabricating process, and the like. However, a channel width (end surface channel width a) and channel height g (end surface channel height g) at the end surface of the channel optical waveguide element 4 are selected in accordance with the mode field diameter of the optical fiber which is coupled.

The end surface channel width a of the channel optical waveguide 4, i.e., the maximum channel width of the taper portion connected to either end of the linear portion of the channel optical waveguide 4, is made to be larger than the channel width at the linear portion (linear portion channel width b). In this way, the mode field diameter of the optical waveguide can be enlarged in the direction parallel to the substrate surface. For example, if the linear portion channel width b is 5 $\mu$m, the end surface channel width a is preferably 5 $\mu$m or more. If the optical waveguide element is coupled with a single mode optical fiber having a mode field diameter of 9.5 $\mu$m, the end surface channel width a is preferably 9 $\mu$m to 20 $\mu$m and the end surface channel height g is preferably 4 $\mu$m to 20 $\mu$m.

In the present embodiment, the channel width is increased in a tapered manner toward the end surfaces at the light entering end portion and the light exiting end portion.

However, it is possible to not increase the channel width and for the channel width to be a constant width. Further, examples of the fine pattern of the channel optical waveguide are linear type, S type, Y branched type, X crossing type, combinations thereof, and the like, and a channel optical waveguide of a desired pattern can be provided in accordance with the object. Moreover, in order to reduce the light propagation loss, offset may be provided as needed between S type channel optical waveguides having different bending directions, or between an S type channel optical waveguide and a linear type channel optical waveguide.

As described above, the cladding layer 5, whose refractive index is smaller than that of the optical waveguide layer 3 and whose thickness increases in a tapered manner toward the end surface, is provided so as to have substantiality the same width as the channel optical waveguide 4, above the light entering end surface and the light exiting end surface of the channel optical waveguide 4. Accordingly, the width at the end surface of the cladding layer 5 (end surface cladding width c) is substantially the same as the end surface channel width a. Note that, "substantially the same as" means that the end surface cladding width c may fall within a range of the end surface channel width a±1 μm. Within this range, the end surface cladding width c may be larger than the end surface channel width a such that the cladding layer 5 is formed to cover the channel optical waveguide 4.

By providing, on the optical waveguide layer 3, the cladding layer 5 whose refractive index is slightly lower than that of the optical waveguide layer 3, the mode field diameter of the optical waveguide can be enlarged in the direction orthogonal to the substrate surface, and the coupling loss between an optical fiber and the optical waveguide element can be greatly reduced. At this time, by making the width of the cladding layer 5 be substantially the same as the width of the channel optical waveguide 4, generation of loss due to mode mismatching can be prevented and the coupling loss between an optical fiber and the optical waveguide element can be further reduced, without the strength of the widthwise direction light confinement drastically varying at the time of enlarging the mode field diameter. Further, by increasing the thickness of the cladding layer 5 in tapered manner toward the end surface, the mode field diameter can be gradually enlarged, and the light propagation loss within the optical waveguide can be reduced.

As will be described hereinafter with reference to FIGS. 3 through 5, the difference in the refractive indices of the optical waveguide layer 3 and the cladding layer 5 is preferably 0.001 or more and 0.05 or less. If the difference in refractive indices is smaller than 0.001, the waveguide mode of the optical waveguide layer becomes a multimode, and the coupling loss with a single mode optical fiber increases. On the other hand, if the difference in refractive indices is greater than 0.05, hardly any increase, in the direction orthogonal to the substrate surface, of the mode field diameter can be seen. Note that the refractive index of the optical waveguide layer 3 is greater than the refractive index of the buffer layer 2, and the difference in refractive indices of the buffer layer 2 and the optical waveguide layer 3 is preferably 0.001 to 1.0.

Figure 3:
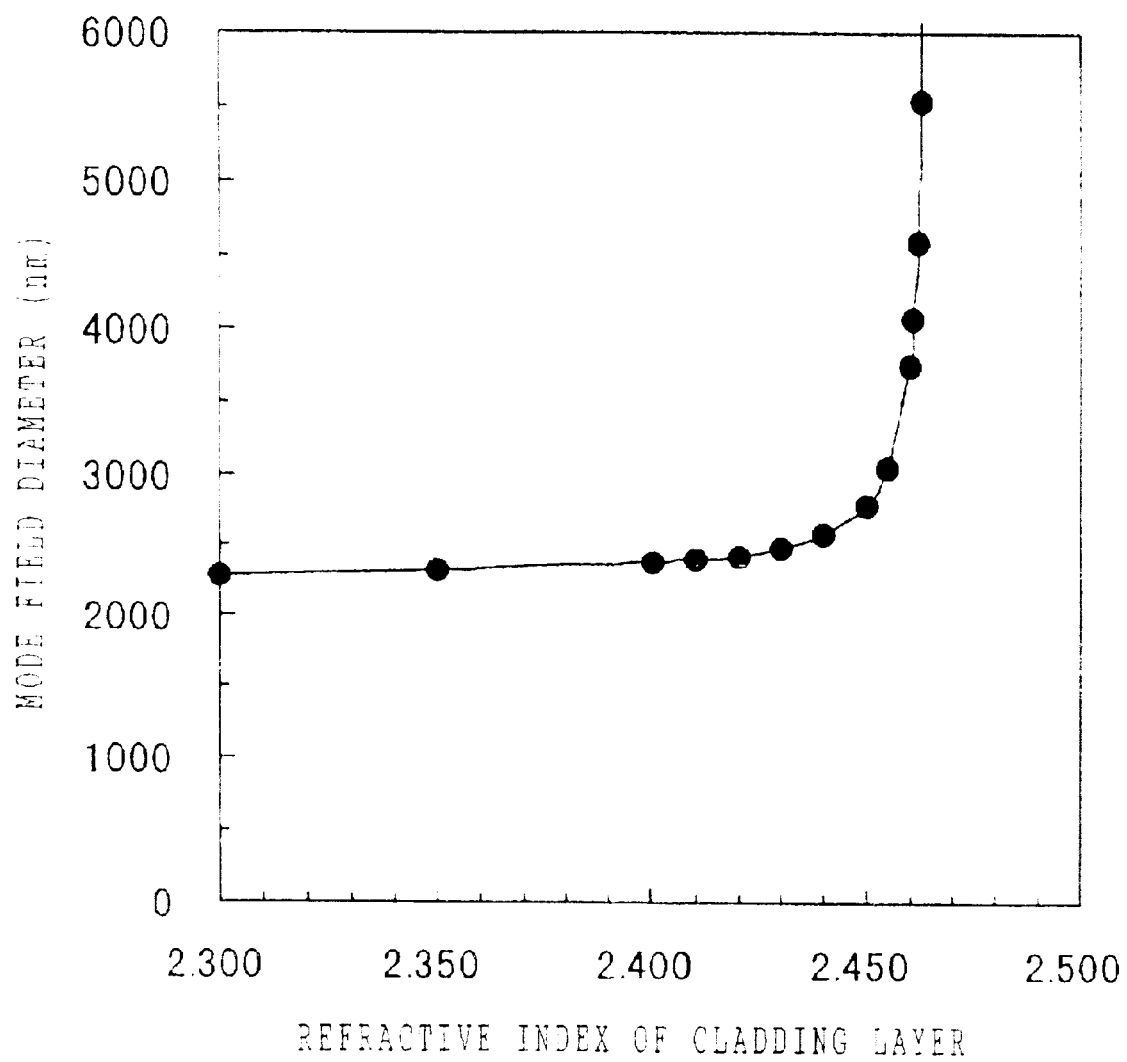
FIG. 3 is a graph showing the relationship between refractive indices of a cladding layer and mode field diameters.

FIG. 3 illustrates an example of analyzing the relationship between the refractive index of the cladding layer and the mode field diameter in a case in which a slab type optical waveguide layer having a refractive index of 2.468 is formed, via a buffer layer having a refractive index of 2.432, on a single crystal substrate having a refractive index of 2.308 with respect to light of a wavelength of 1.3 μm, and a slab type cladding layer is formed on this slab type optical waveguide layer. As can be seen from FIG. 3, as the refractive index of the cladding layer approaches the 2.468 refractive index of the optical waveguide layer, the mode field diameter gradually increases from about 2.420. When the refractive index of the cladding layer is about 2.458, the mode field diameter drastically increases. Accordingly, in the present embodiment as well, when the difference in refractive indices between the optical waveguide layer 3 and the cladding layer 5 is 0.05 or less, it is possible to obtain an enlarged mode field diameter.

Figure 4:
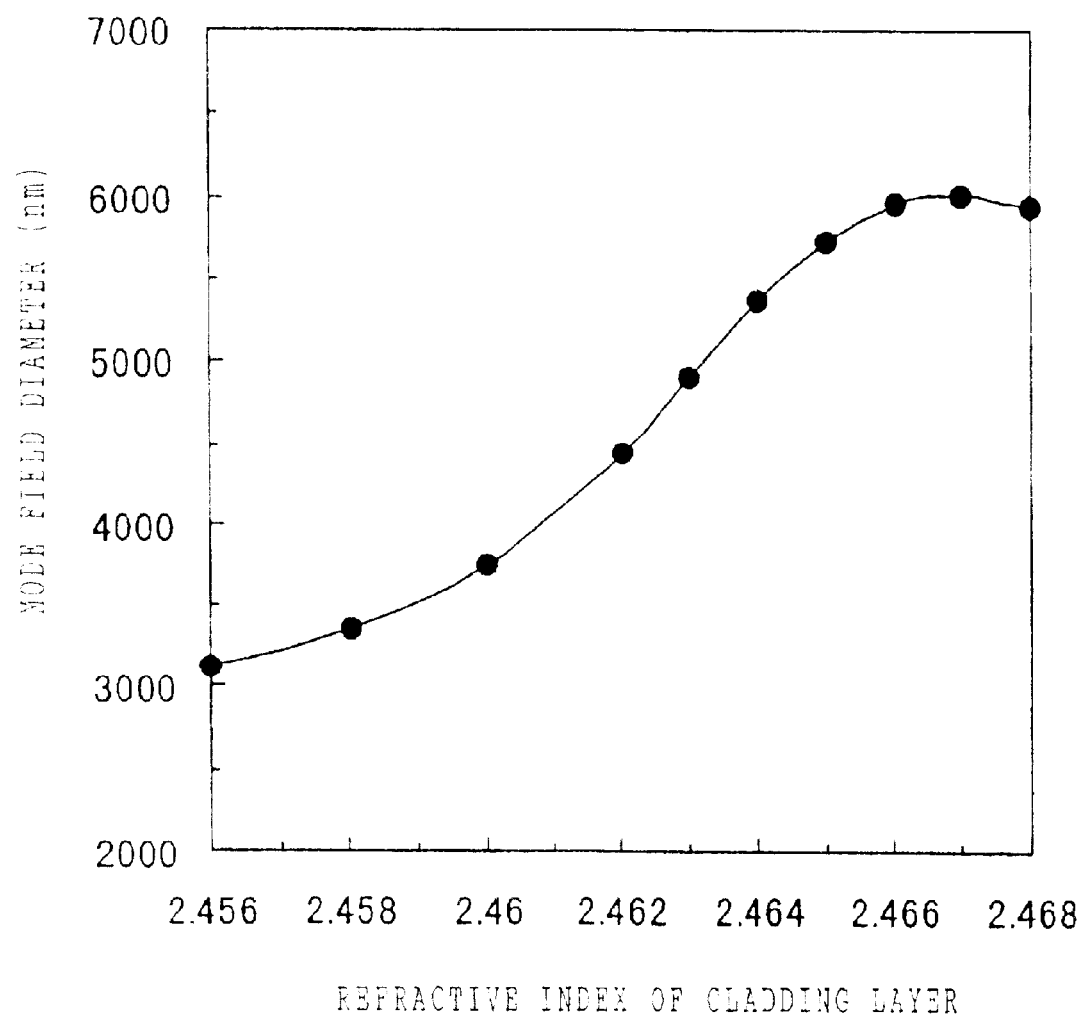
FIG. 4 is a graph showing the relationship between refractive indices of the cladding layer and mode field diameters.

FIG. 4 shows an example of analyzing the relationship between the refractive index of the cladding layer 5 and the mode field diameter when the end surface cladding thickness d is 5 μm, in an optical waveguide element (which hereinafter will be called the "optical waveguide element of FIG. 4") having a structure which is the same as that of the present embodiment, and more specifically, having the following structure. The optical waveguide layer 3 having a refractive index of 2.468 is provided, via the buffer layer 2 having a refractive index of 2.432, on the single crystal substrate 1 having a refractive index of 2.308 with respect to light of a wavelength of 1.3 μm. The optical waveguide layer 3 is provided with the ridge type channel optical waveguide 4 whose end surface channel width a is 8 μm, whose end surface channel height g is 2.2 μm, and whose step f is 0.5 μm. The cladding layers 5 are formed on the optical waveguide layer 3. Note that an air layer is formed above the optical waveguide element.

As can be seen from FIG. 4, as the refractive index of the cladding layer 5 increases with respect to the refractive index of 2.468 of the optical waveguide layer 3, the mode field diameter increases gradually. When the refractive index of the cladding layer 5 is about 2.466, the increase in the mode field diameter tops out. In the region in which the enlarged mode field diameter gradually approaches a constant value, i.e., in the region in which the difference in refractive indices of the optical waveguide layer 3 and the cladding layer 5 is smaller than 0.001, the light confinement in the optical waveguide layer 3 is extremely weak, and the waveguide mode is not a single mode within the optical waveguide layer 3, but changes to a multimode in the region extending from the optical waveguide layer 3 to the cladding layer 5. When the waveguide mode becomes a multimode in this way, the coupling loss with a single mode optical fiber becomes large, which is not preferable. Accordingly, in the present embodiment as well, in order to keep the waveguide mode a single mode, the difference in refractive indices of the optical waveguide layer 3 and the cladding layer 5 is preferably 0.001 or more.

Figure 5:
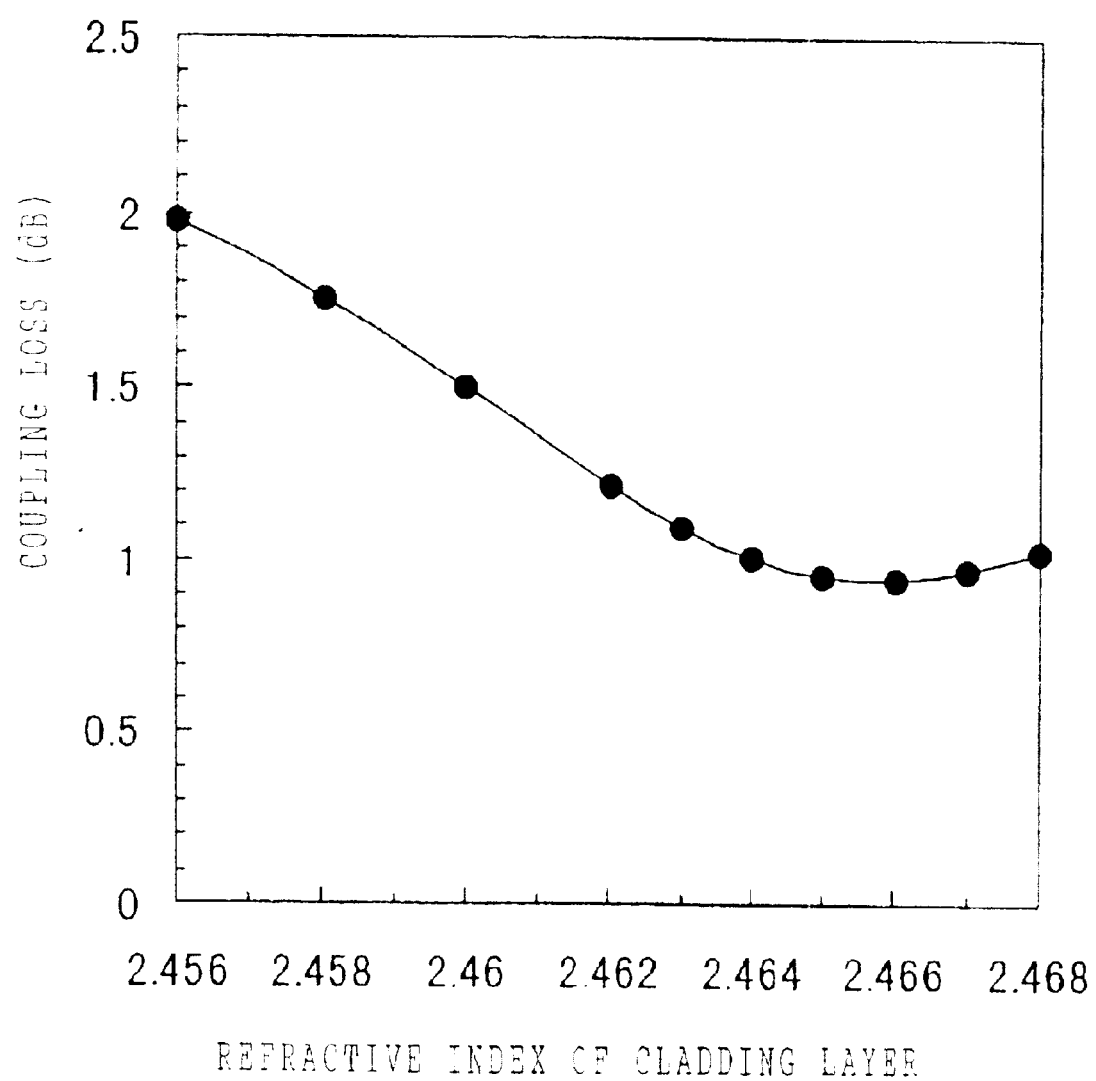
FIG. 5 is a graph showing the relationship between refractive indices of the cladding layer and coupling losses.

FIG. 5 shows an example of analyzing the relationship between the coupling loss and the refractive index of the cladding layer 5 in the optical waveguide element of FIG. 4 when the end surface cladding thickness d is 5 μm. Note that the coupling loss is the coupling loss in a case in which the optical waveguide element is coupled to a single mode optical fiber whose mode field diameter is 9.5 μm.

When there is no cladding layer 5, the mode field diameter of the channel optical waveguide 4, whose channel width is 5 μm and whose channel height is 0.5 μm, is 6.2 μm in the direction parallel to the substrate surface and is 2.2 μm in the direction orthogonal to the substrate surface. The coupling loss with a single mode optical fiber having a mode field diameter of 9.5 μm is theoretically 4.2 dB. As can be seen from FIG. 5, at any refractive index, the coupling loss can be greatly reduced with respect to the 4.2 dB in the case in which there is no cladding layer 5. In the region where the refractive index of the cladding layer 5 is about 2.466 and the difference in the refractive indices of the optical waveguide layer 3 and the cladding layer 5 is 0.002, the coupling loss is a minimum of 0.95 dB.

The thickness of the cladding layer 5 increases in a tapered manner toward the end surface. The thickness of the thickest portion of the taper, i.e., the thickness at the end surface of the cladding layer 5 (the "end surface cladding thickness" d), can be appropriately selected from a range of 1 μm or more, and preferably 2 μm to 10 μm, in accordance with the desired mode field diameter. Because the sectional configuration of the optical fiber is usually circular, the mode field diameter of the channel optical waveguide 4 is preferably substantially equal in the direction parallel to the substrate surface and the direction orthogonal to the substrate surface. The end surface cladding thickness d is preferably determined such that the diameter in the direction parallel to the substrate surface and the diameter in the direction orthogonal to the substrate surface are substantially equal.

From the standpoint of achieving a balance between the radiation loss and the device size, a taper length e of the cladding layer 5 is preferably within a range of 50 μm to 5000 μm, and more preferably within a range of 200 μm to 2000 μm.

Figure 6:
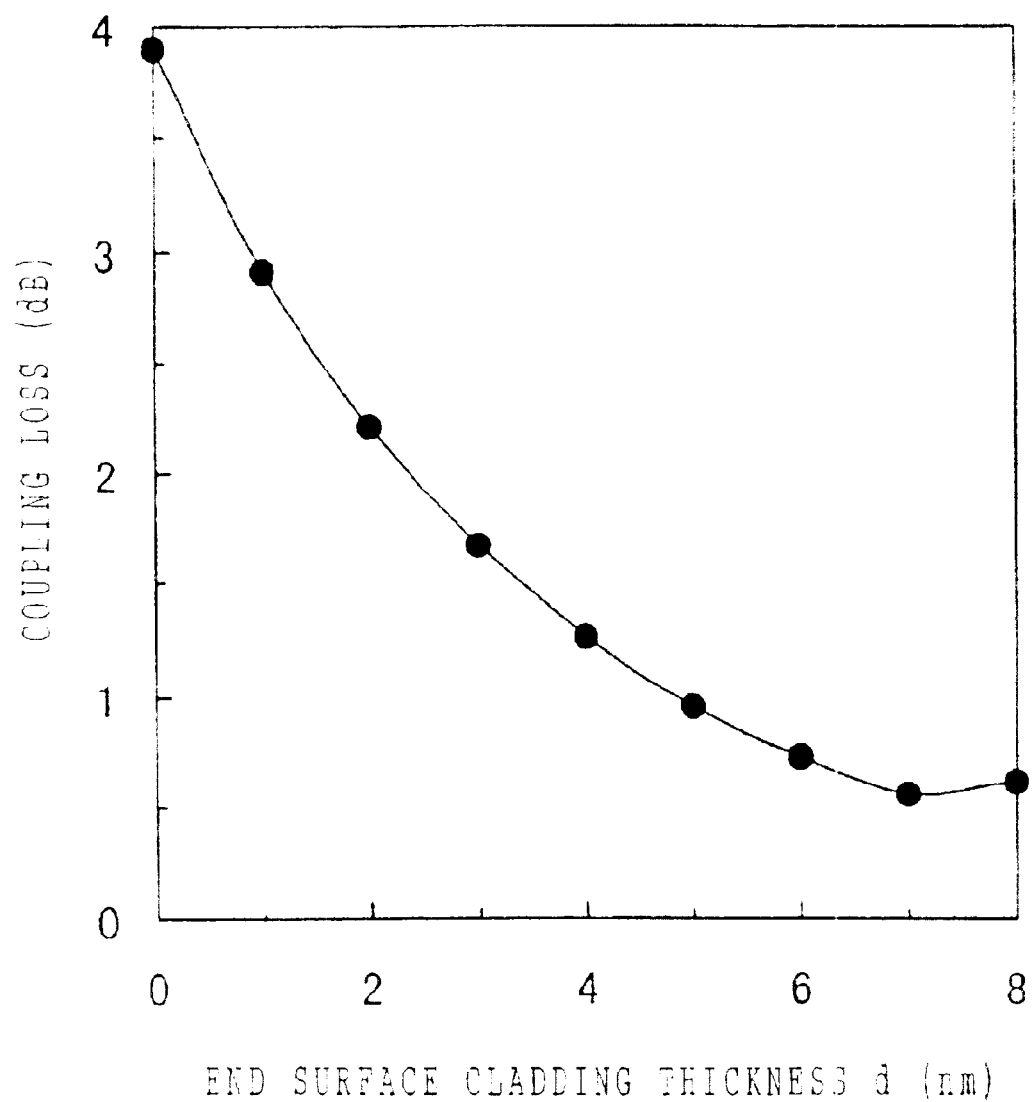
FIG. 6 is a graph showing the relationship between coupling losses and thicknesses of the cladding layer at the end surface.

FIG. 6 shows an example of analysis of the relationship between the coupling loss and the end surface cladding thickness d when the refractive index of the cladding layer 5 is 2.465 in the optical waveguide element of FIG. 4. Note that the coupling loss is the coupling loss when the optical waveguide element is coupled with a single mode optical fiber whose mode field diameter is 9.5 μm.

As can be seen from FIG. 6, as described above, when a cladding layer 5 whose end surface cladding width c is 8 μm is formed on the channel optical waveguide 4 whose end surface channel width a is 8 μm, whose end surface channel height g is 2.2 μm, and whose step f is 0.5 μm, the coupling loss decreases as the end surface cladding thickness d increases. When the end surface cladding thickness d is about 7 μm, the coupling loss is a minimum of 0.56 dB. However, because the coupling loss is smaller than 1 dB when the end surface cladding thickness d is 5 μm or more, it is preferable to select an appropriate end surface thickness of 5 μm or more, in consideration of the time required for fabrication and the like.

As described above, when the cladding layer 5 is provided at substantially the same width as the channel optical waveguide 4 and the width of the channel optical waveguide 4 increases in a tapered manner toward the end surface, the width of the cladding layer 5 increases in a tapered manner toward the end surface. The end surface cladding width c is substantially the same size as the end surface channel width a. Accordingly, when coupling with a single mode optical fiber whose mode field diameter is 9.5 μm, the end surface cladding width c is preferably 5 μm or more, and is more preferably 9 μm to 20 μm.

Note that, in FIGS. 3 through 6, the refractive indices are refractive indices with respect to light of a wavelength of 1.3 μm.

Figure 8:
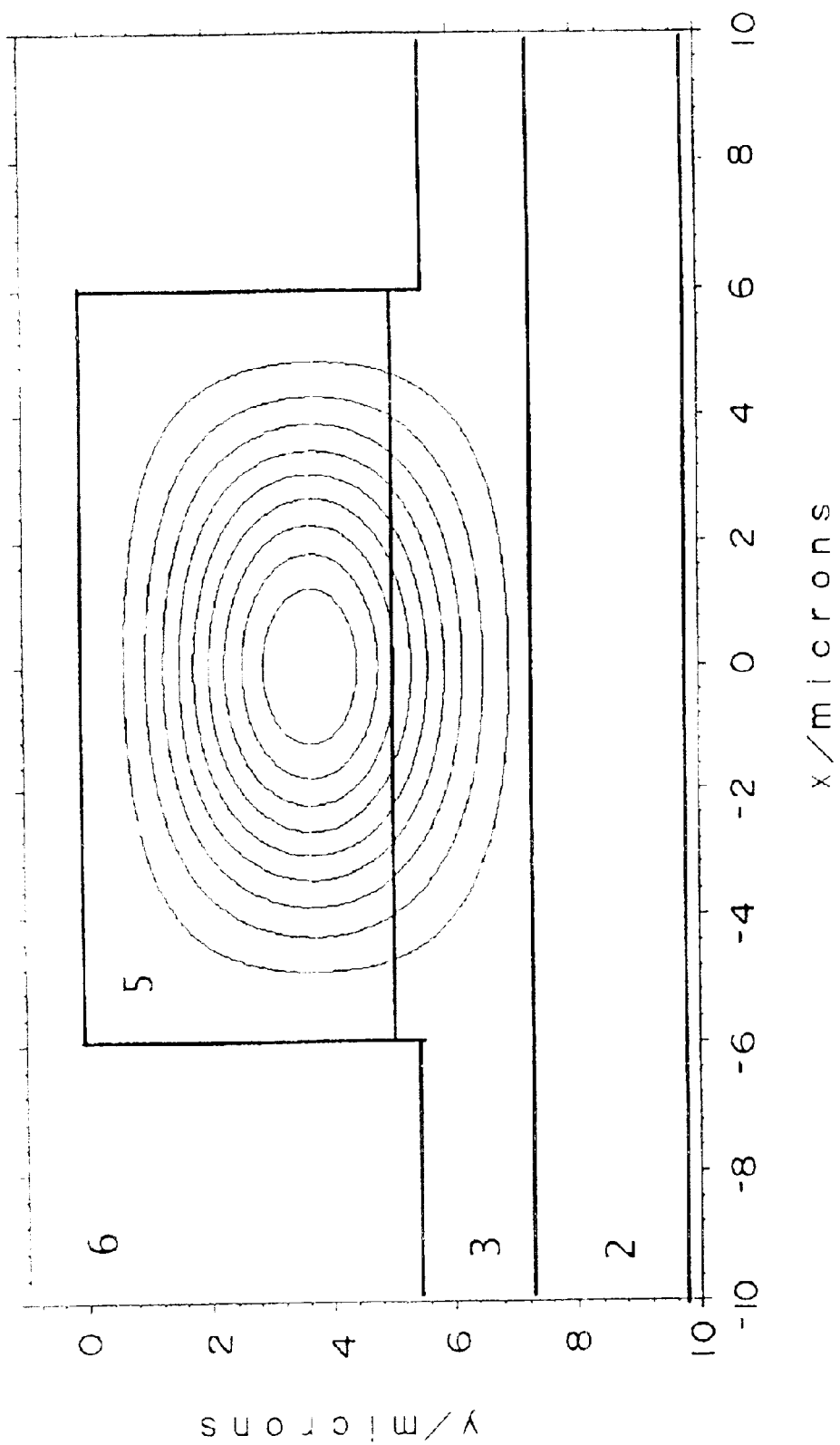
FIG. 8 is a graph showing a mode profile in a case in which the cladding layer is provided.

FIG. 8 shows the results of simulation of the mode profile at the end surface of the optical waveguide element of the present embodiment. The simulation of the mode profile was carried out by the finite difference method. In this simulation, the end surface cladding width c was made to be 12 μm and the end surface cladding thickness d was made to be 5 μm, in an optical waveguide element (hereinafter called the "optical waveguide element of FIG. 8") whose structure was the same as that of the present embodiment and which, more specifically, was as follows. The optical waveguide layer 3 having a refractive index of 2.442 was provided, via the buffer layer 2 having a refractive index of 2.416, on the single crystal substrate 1 having a refractive index of 2.284 with respect to light of a wavelength of 1.55 μm. The optical waveguide layer 3 was provided with the ridge type channel optical waveguide 4 whose end surface channel width a was 12 μm, whose end surface channel height g was 2.2 μm, and whose step f was 0.5 μm. The cladding layers 5 were formed on the optical waveguide layer 3. Note that the region above the optical waveguide element was an air layer 6.

Figure 7:
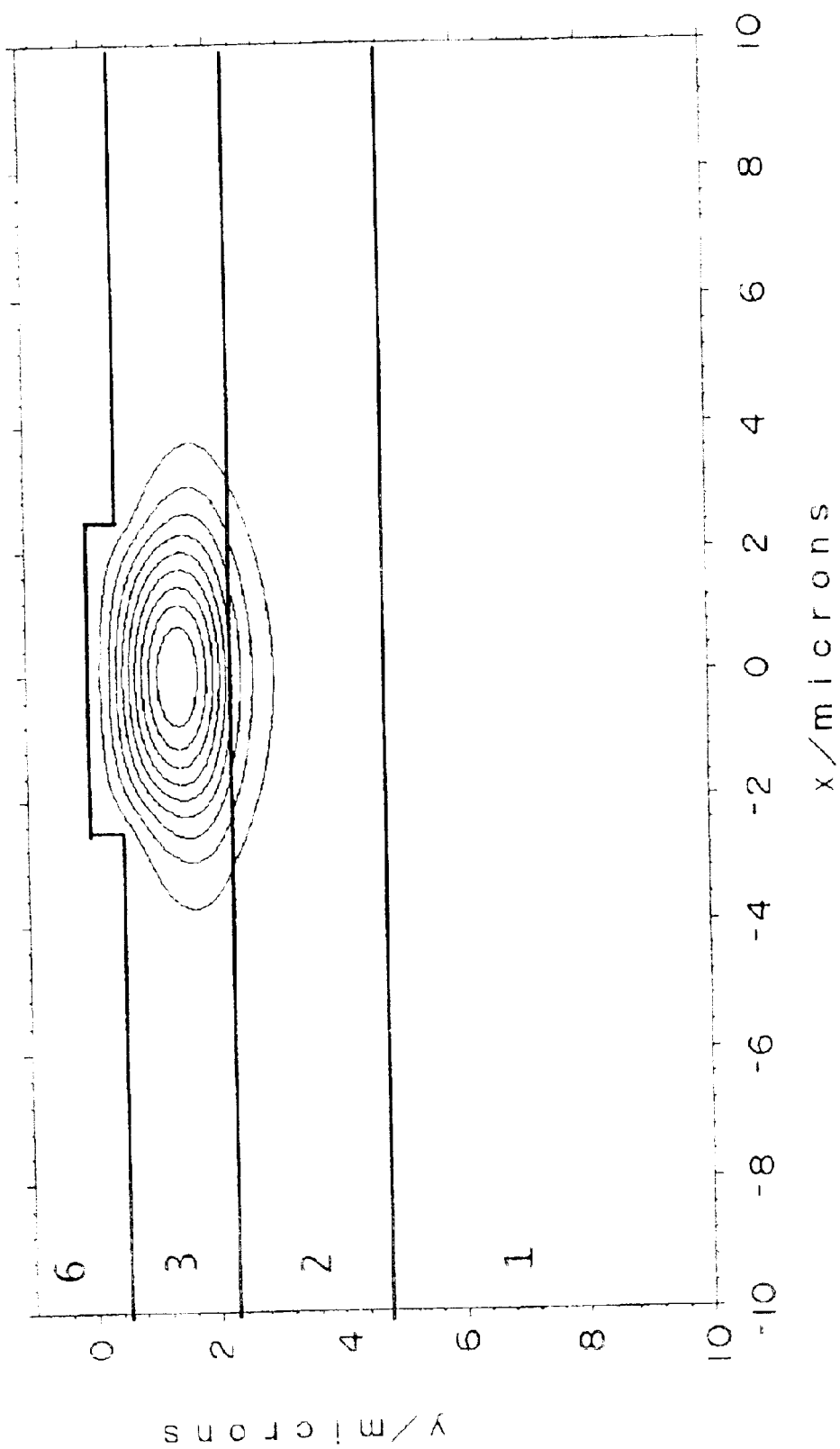
FIG. 7 is a graph showing a mode profile in a case in which no cladding layer is provided.

For comparison with FIG. 8, FIG. 7 shows the results of simulation of the mode profile in a case in which no cladding layer was provided on the optical waveguide layer. In this simulation, the end surface channel width a was 5 μm.

As can be understood from the results of these simulations, in the optical waveguide element of the present embodiment, by increasing the end surface channel width a, the mode field diameter is increased in the direction parallel to the substrate surface, and by providing the cladding layer 5 on the optical waveguide layer 3, the mode field diameter is increased in the direction orthogonal to the substrate surface. Further, by making the end surface channel width a and the end surface channel width c substantially the same, generation of loss due to mode mismatching can be prevented, without the strength of the light confinement in the widthwise direction varying drastically at the time of increasing the mode field diameter. As a result, the coupling loss of an optical fiber and the optical waveguide element is greatly reduced.

Figure 9:
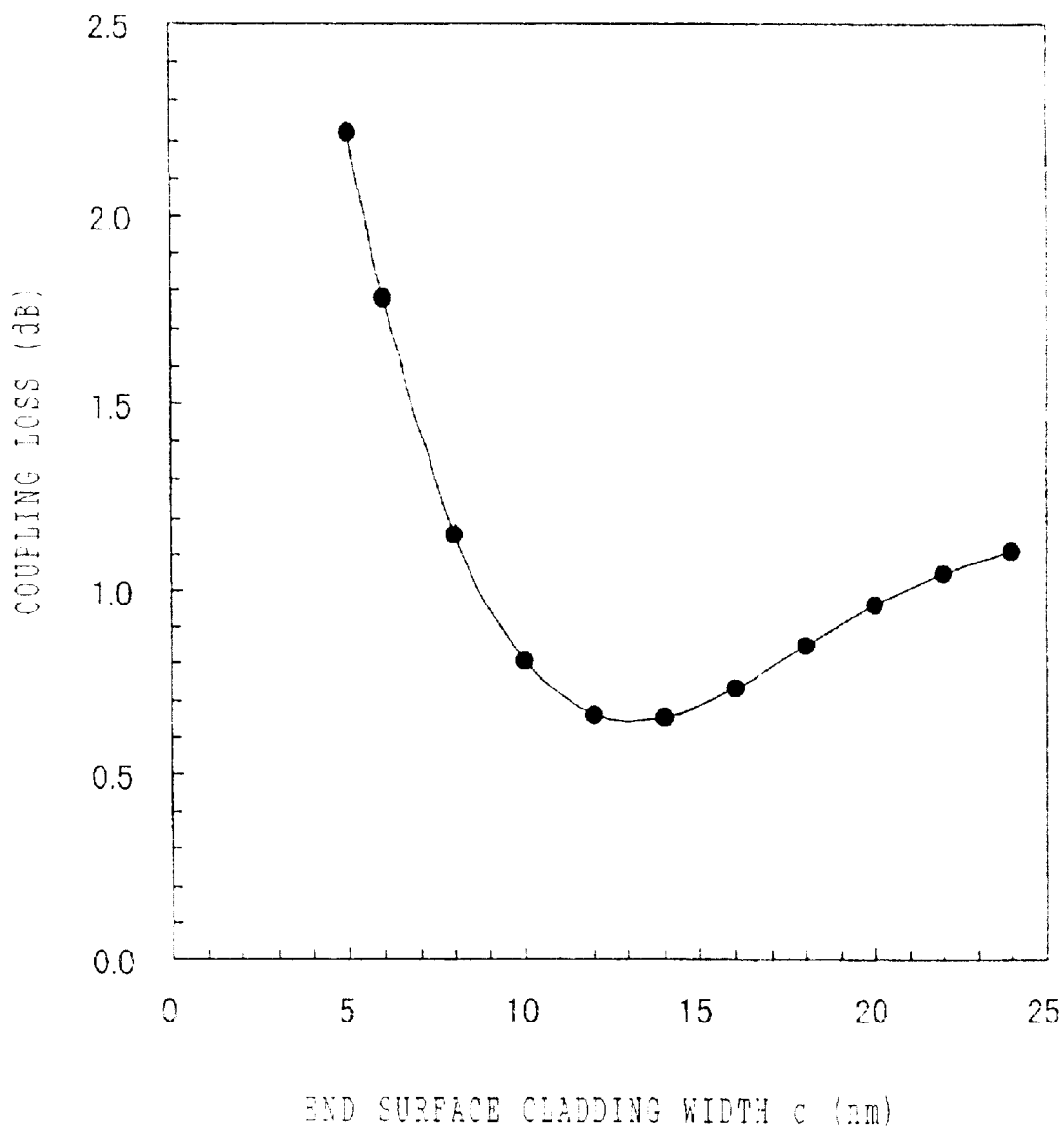
FIG. 9 is a graph showing the relationship between coupling losses and widths of the cladding layer at the end surface.

FIG. 9 shows an example of analyzing the relationship between the coupling loss and the end surface cladding width c, when the end surface cladding thickness d is 5 μm in the optical waveguide element of FIG. 8. Note that the coupling loss is the coupling loss in a case of coupling with a single mode optical fiber having a mode field diameter of 9.5 μm. In the above-described simulation, the end surface cladding width c is 12 μm. As shown in FIG. 9, from the point where the end surface cladding width c becomes 5 μm, the coupling loss gradually decreases. The coupling loss becomes 1 dB or less in the range where the end surface cladding width c is 9 μm to 20 μm.

Note that, in FIGS. 7 through 9, the refractive index is the refractive index with respect to light of a wavelength of 1.55 μm.

Materials of Respective Layers of Optical Waveguide Element

Next, the materials used in the optical waveguide element relating to the present embodiment will be described.

As the single crystal substrate 1, a single crystal substrate formed from any of the following oxides may be used: $SrTiO_3$, Nb-doped $SrTiO_3$, La-doped $SrTiO_3$, $BaTiO_3$, $BaZrO_3$, $LaAlO_3$, $ZrO_2$, $Y_2O_3$ 8%-$ZrO_2$, MgO, $MgAl_2O_4$, $LiNbO_3$, $LiTaO_3$, $Al_2O_3$, ZnO, Al-doped ZnO, $In_2O_3$, $RuO_2$, $BaPbO_3$, $SrRuO_3$, $YBa_2Cu_3O_{7-x}$, $SrVO_3$, $LaNiO_3$, $La_{0.5}Sr_{0.5}CoO_3$, $ZnGa_2O_4$, $CdGa_2O_4$, $Mg_2TiO_4$, $Mg_2TiO_4$, $MgTi_2O_4$, and the like. Among these, at least single crystal substrates of oxides formed from $SrTiO_3$, such as $SrTiO_3$, Nb-doped $SrTiO_3$, La-doped $SrTiO_3$, and the like, are preferable.

An $ABO_3$ type perovskite ferroelectric or any of various electro-optical materials can be used as the buffer layer 2, the optical waveguide layer 3 and the cladding layer 5. Examples of pyramidal quadratic, trigonal, orthorhombic and pseudo-cubic materials are $BaTiO_3$, $PBTiO_3$, $Pb_{1-x}La_x$ ($Zr_yTi_{1-y})_{1-x/4}O_3$ (0<x<0.3, 0<y<1.0, called PZT, PLT, PLZT depending on the values of x and y), $Pb(Mg_{1/3}Nb_{2/3})O_3$, $KNbO_3$, and the like. Examples of hexagonal or trigonal materials are ferroelectrics exemplified by $LiNbO_3$, $LiTaO_3$, and the like, and ferroelectrics in which Ti diffusion or proton exchange has been carried out on ferroelectrics exemplified by $LiNbO_3$, $LiTaO_3$, and the like. Examples of tungsten bronze type materials are $Sr_xBa_{1-x}Nb_2O_6$, $Pb_xBa_{1-xNb2}O_6$, and the like, as well as $Bi_4Ti_3O_{12}$, $Pb_2KNb_5O_{15}$, $K_3Li_2Nb_5O_{15}$, and substituted derivatives thereof and the like. Examples of magneto-optical materials are $Y_3Al_5O_{12}$, $Y_3Fe_5O_{12}$, $Y_3Ga_5O_{12}$, and the like, as well as light-amplified materials in which Er, Nd, Pr or the like is doped into the aforementioned magneto-optical materials. Among these, oxide ferroelectric materials, which have a high electro-optical coefficient and a good electro-optical effect, are preferable, and $Pb_{1-x}La_x(Zr_yTi_{1-y})_{1-x/4}O_3$ (0<x<0.3, 0<y<1.0) is particular preferable. Note that the materials forming the buffer layer 2, the optical waveguide layer 3 and the cladding layer 5 are not limited to the materials listed as examples above.

The thin film formed from the oxide ferroelectric material can be formed by a vapor phase growth method selected from electron beam vapor deposition, flash vapor deposition, ion plating, Rf-magnetron sputtering, ion beam sputtering, laser abrasion, molecular beam epitaxy (MBE), chemical vapor deposition (CVD), plasma CVD, metal organic chemical vapor deposition (MOCVD), or the like, or by an epitaxial growth method using a solid phase growth method using a wet process such as a sol-gel method, a metal organic decomposition (MOD) deposition method or the like.

Particularly preferable among these is a solid phase epitaxial growth method in which a solution of a metal organic compound, such as a metal alkoxide or an organic metal salt or the like, is applied to a substrate by a wet process such as a sol-gel method or a MOD method or the like, the coated film is made amorphous by heating, and the obtained amorphous thin film is heated further and crystallized. In this way, when, after being formed, an amorphous thin film is solid phase epitaxially grown, an extremely smooth thin film having low light loss due to scattering can be formed.

In particular, when preparing a patterned epitaxial thin film, by carrying out patterning in the state in which the thin film is an amorphous thin film and by solid phase epitaxially growing the patterned amorphous thin film, it is possible to obtain edges, side walls, and surfaces which are extremely smooth and whose light loss due to scattering is low. Further, as compared to various types of vapor phase growth methods, with a solid phase epitaxial growth method, the equipment costs are low, uniformity within the substrate surface is good, and in addition, there is the advantage that the refractive index of the thin film can be controlled easily and with good reproducibility by the compounded composition of the metal organic compound precursors.

The metal organic compound is selected from metal alkoxides and metal salts, which are reaction products of various types of metals and organic compounds (preferably organic compounds whose boiling point at normal pressure is 80° C. or higher). However, the metal organic compound is not limited to these compounds. The organic ligand of the metal alkoxide compound is selected from $R_1O$— and $R_2OR_3O$— (where $R_1$ and $R_2$ represent aliphatic hydrocarbon groups, and $R_3$ represents a bivalent aliphatic hydrocarbon group which may have an ether bond).

The metal or the organic compound which is the raw material is reacted, in a predetermined composition, with a solvent (preferably a solvent having a boiling point of 80° C. or more at normal pressure) selected from alcohols, diketones, ketonic acids, alkylesters, oxyacids, oxyketones, acetic acid, and the like, or is dissolved in such a solvent, and thereafter, is applied to the single crystal substrate. The metal organic compound may be applied after being hydrolyzed. However, in order to obtain an epitaxial ferroelectric thin film having good characteristics, it is preferable to not hydrolyze the metal organic compound. Further, from the standpoint of the quality of the obtained thin film, these reactions are preferably carried out in a dry nitrogen or argon atmosphere.

The metal alkoxide compound can be synthesized by carrying out distillation or reflux in an organic solvent which contains a metal and is expressed by $R_1OH$ or $R_2OR_3OH$. $R_1$ and $R_2$ represent aliphatic hydrocarbon groups, and $R_1$ and $R_2$ are preferably alkyl groups having from 1 to 4 carbon atoms. $R_3$ is preferably an alkylene group having from 2 to 4 carbon atoms, or a bivalent group having a total of 4 to 8 carbon atoms in which an alkylene group having from 2 to 4 carbon atoms is bonded by an ether bond.

As the solvent whose boiling point is 80° C. or more, alcohols whose alcohol exchange reaction of the metal alkoxide is easy are most preferable, such as $(CH_3)_2CHOH$ (boiling point 82.3° C.), $CH_3(C_2H_5)CHOH$ (boiling point 99.5° C.), $(CH_3)_2CHCH_2OH$ (boiling point 108° C.), $C_4H_9OH$ (boiling point 117.7° C.), $(CH_3)_2CHC_2H_4OH$ (boiling point 130.5° C.), $CH_3OCH_2CH_2OH$ (boiling point 124.5° C.), $C_2H_5OCH_2CH_2OH$ (boiling point 135° C.), $C_4H_9OCH_2CH_2OH$ (boiling point 171° C.), and the like. However, the solvent is not limited to these, and $C_2H_5OH$ (boiling point 78.3° C.) or the like may be used.

The solution containing the metal organic compound is applied onto the substrate by a method selected from a spin coating method, a dipping method, a spray method, a screen printing method, and an ink jet method. From the standpoint of the quality of the obtained thin film, it is preferable to apply the solution in a dry nitrogen or argon atmosphere.

After the solution including the metal organic compound is applied, as needed, in an atmosphere containing oxygen (and desirably in oxygen) and as a pre-process, the temperature is raised at a temperature raising speed of 0.1 to 1000° C./sec (desirably 1 to 100° C./sec), and the substrate is heated in a temperature range of 100° C. to 500° C. (desirably 200° C. to 400° C.) at which crystallization does not occur. In this way, the coated layer is thermally decomposed, and an amorphous thin film is formed. Further, in an atmosphere containing oxygen (and desirably in oxygen), the temperature is raised at a temperature raising speed of 1 to 500° C./sec (desirably 10 to 100° C./sec), heating is carried out in a temperature range of 500° C. to 1200° C. (desirably 600° C. to 900° C.), and an amorphous ferroelectric thin film is solid phase epitaxially grown from the surface of the substrate. In this process of solid phase epitaxial crystallization, heating is carried out in the aforementioned temperature range from 1 second to 24 hours, and desirably, from 10 seconds to 12 hours. Moreover, from the standpoint of quality of the obtained thin film, an oxygen atmosphere which has been dried for a given time is preferably used as the oxygen atmosphere, but the oxygen atmosphere may be humidified as needed.

The thickness of the thin film formed by solid phase epitaxial growth being carried out one time is 10 nm to 1000 nm, and desirably, 10 nm to 200 nm. By repeating the above-described solid phase epitaxial growth, a thin film of a desired thickness can be obtained. When solid phase epitaxial growth is carried out repeatedly, it is desirable to carry out cooling at a cooling speed of 0.01 to 100° C./sec after each epitaxial growth process.

Method of Fabricating Optical Waveguide Element

The following two methods are examples of methods for fabricating the optical waveguide element having the above-described structure. Hereinafter, outlines of these methods of fabricating will be described.

In the first fabricating method, a buffer layer is formed by epitaxial growth on a single crystal substrate, and an amorphous thin film is formed by a wet process on the buffer layer. Thereafter, the amorphous thin film is patterned into a predetermined channel pattern by etching. The amorphous thin film which has been patterned is solid phase epitaxially grown, so as to form an optical waveguide layer at which a ridge type channel optical waveguide is formed. Then, an amorphous thin film is formed by a wet process on the surface of the optical waveguide layer. Thereafter, the amorphous thin film is etched in taper shapes whose thicknesses vary toward the end surfaces. The amorphous thin film, which has been reshaped into taper shapes, is heated and is solid phase epitaxially grown. In this way, taper-shaped cladding layers are formed.

In the etching of the amorphous thin film, the etching speed is fast, the stopping or controlling of etching is easy. Specifically, after a photoresist or a resist for an electron beam is applied onto the surface of the amorphous thin film, the amorphous thin film is patterned by carrying out exposure, developing, etching, and resist removal in that order.

The etching method may be either of wet etching by an aqueous solution of HCl, $HNO_3$, HF, $H_2SO_4$, $H_3PO_4$, $C_2H_2O_2$, $NH_4F$ or the like or a mixed aqueous solution thereof, or dry etching such as reactive ion etching by $CCl_4$, $CCl_2F_2$, $CHClFCF_3$ or a mixed gas of any of these with $O_2$, ion beam etching, or the like. Wet etching is preferable from the standpoint of carrying out working accurately and easily in a short period of time.

In the first fabricating method, when the patterned epitaxial thin films of the optical waveguide layer, the cladding layer and the like are prepared, patterning is carried out with the thin film in an amorphous state, and the patterned, amorphous thin film is solid phase epitaxially grown. Thus, edges, side walls and surfaces, which are extremely smooth and have a low light loss due to scattering, can be obtained.

In the second fabricating method, a buffer layer, a slab type optical waveguide layer, and a slab type cladding layer are formed in that order by solid phase epitaxial growth on a single crystal substrate. Then, the portions of the slab type cladding layer existing above the light entering end portion and the light exiting end portion at the position where the channel optical waveguide is to be formed, are etched by etching into taper shapes whose thicknesses (or thicknesses and widths) vary toward the end surfaces. Thereafter, the slab type optical waveguide layer is patterned in a predetermined channel pattern similarly by etching, such that a ridge type channel optical waveguide, in which taper-shaped cladding layers are formed above the light entering end portion and the light exiting end portion, is formed.

Either of the aforementioned wet etching and dry etching can be used as the etching method. However, from the standpoint of excellent surface smoothness after etching, dry etching is preferable.

In the second fabricating method, patterning is carried out after solid phase epitaxial growth, without stopping the optical waveguide layer and the cladding layer temporarily in amorphous states. Thus, a optical waveguide layer and a cladding layer having excellent crystallinity can be obtained.

Further, in a case in which the cladding layer is etched in taper shapes after the optical waveguide layer is patterned in a predetermined channel pattern and the channel optical waveguide is formed, at the time of etching the cladding layer, there is the concern that etching will be carried out to the optical waveguide layer and the precision of fabricating the channel optical waveguide will deteriorate. However, in this method, after the cladding layer is etched in taper shapes, the optical waveguide layer is patterned in a predetermined channel pattern, and the channel optical waveguide is formed. Thus, the channel optical waveguide can be formed precisely.

As described above, the optical waveguide element of the present embodiment has the optical waveguide layer having the ridge type channel optical waveguide. The cladding layer, which has a smaller refractive index than the optical waveguide layer, is provided above each of the light entering end portion and the light exiting end portion of the channel optical waveguide. Thus, the mode field diameter of the optical waveguide can be enlarged in the direction orthogonal to the substrate surface, and the coupling loss between an optical fiber and the optical waveguide element can be reduced. In particular, in the optical waveguide element of the present embodiment, the width of the cladding layer is substantially the same as the width of the channel optical waveguide. Thus, without the strength of light confinement in the widthwise direction changing drastically at the time of enlarging the mode field diameter, the generation of coupling loss due to mode mismatching can be prevented, and the coupling loss between the optical waveguide element and an optical fiber can be greatly reduced.

Further, in the present embodiment, the thickness of the cladding layer is increased in a tapered manner toward the end surface. Thus, the mode field diameter can be gradually enlarged, and the light propagation loss within the optical waveguide can also be reduced. Moreover, because the widths of the channel optical waveguide and the cladding layer increase in a tapered manner toward the end surfaces, the mode field diameter of the optical waveguide can be enlarged also in the direction parallel to the substrate surface.

As the method of preparing the patterned epitaxial thin films of the optical waveguide layer, the cladding layer and the like of the optical waveguide element of the present embodiment, there are the first method, in which patterning is carried out with the thin film being in an amorphous state and the patterned amorphous thin film is solid phase epitaxially grown, and the second method of patterning the thin film which has been solid phase epitaxially grown. The first method has the advantage that, when the optical waveguide layer and the cladding layer are prepared, extremely smooth edges, side walls, and surfaces, whose light loss due to scattering is low, can be obtained. The second method has the advantages that, when the optical waveguide layer and the cladding layer are prepared, an optical waveguide layer and a cladding layer having excellent crystallinity can be obtained, and the channel optical waveguide can be formed precisely.

Figure 10:
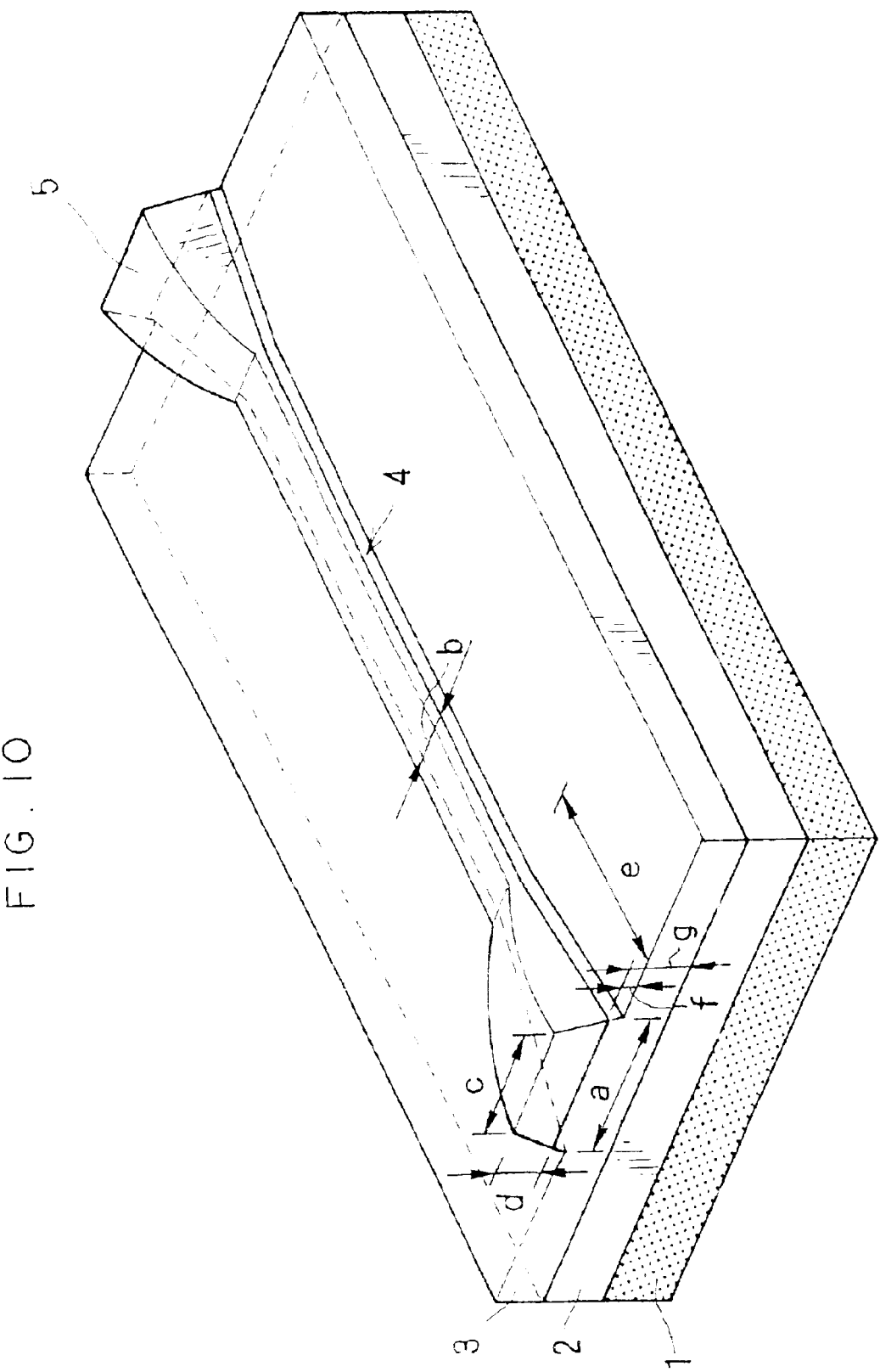
FIG. 10 is a perspective view showing a modified example of the optical waveguide element relating to the present embodiment.

Note that, in the above-described embodiment, explanation is given of an example in which the cladding layers are formed only above the light entering end portion and the light exiting end portion of the channel optical waveguide of the optical waveguide layer surface. However, as shown in FIG. 10, it is possible to form, above the entire region of the channel optical waveguide 4, the cladding layer 5 which has substantially the same width as the channel optical waveguide 4 and whose thickness increases in a tapered manner toward the end surfaces.

Moreover, in the above-described embodiment, a case is described in which the coupling loss with a single mode optical fiber having a mode field diameter of 9.5 μm is reduced. However, the width and height of the channel optical waveguide and the width and thickness of the cladding layer can be similarly designed in accordance with the mode field diameter of the optical fiber.

EXAMPLES

Next, the present invention will be described in further detail by Examples. However, it is to be noted that the present invention is not limited to the following Examples.

Example 1

In the present Example, explanation is given of an example of fabricating an optical waveguide element of the structure shown in FIG. 1 in which the PLZT buffer layer 2 having a refractive index of 2.432, the PZT optical waveguide layer 3 having a refractive index of 2.468, and the PZT cladding layers 5 having refractive indices of 2.466 are formed on the single crystal substrate 1 formed from Nb-doped $SrTiO_3$ (100) having a refractive index of 2.308. Note that, in the present Example, the refractive index of each layer is the refractive index with respect to light of a wavelength of 1.3 μm.

Anhydrous lead acetate $Pb(CH_3COO)_2$, lanthanum isopropoxide $La(O\text{-i-}C_3H_7)_3$, zirconium isopropoxide $Zr(O\text{-i-}C_3H_7)_4$, and titanium isopropoxide $Ti(O\text{-i-}C_3H_7)_4$ were used as the starting materials. These starting materials were dissolved in 2-methoxyethanol, and thereafter, the solution was distilled and refluxed. Finally, a precursor solution for the buffer layer, for forming the PLZT buffer layer of a composition having a refractive index of 2.432 and a Pb concentration of 0.6 M, was prepared.

Figure 11A:
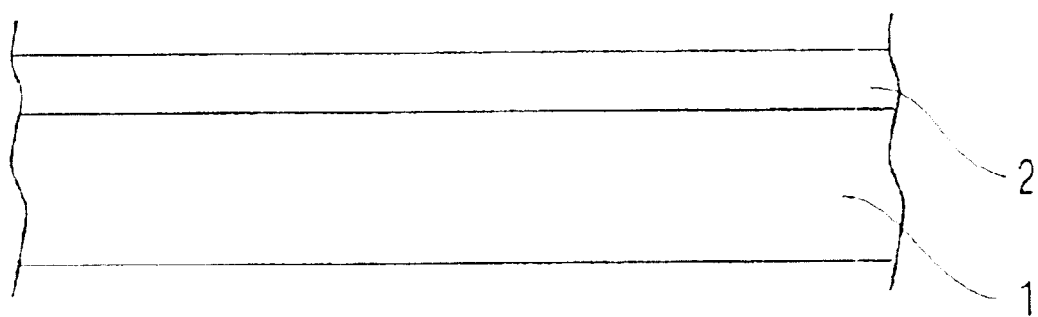
FIG. 11A is a cross-sectional view, along a light propagating direction, showing a buffer layer forming step in a process of fabricating the optical waveguide element of Example 1.
Figure 11B:
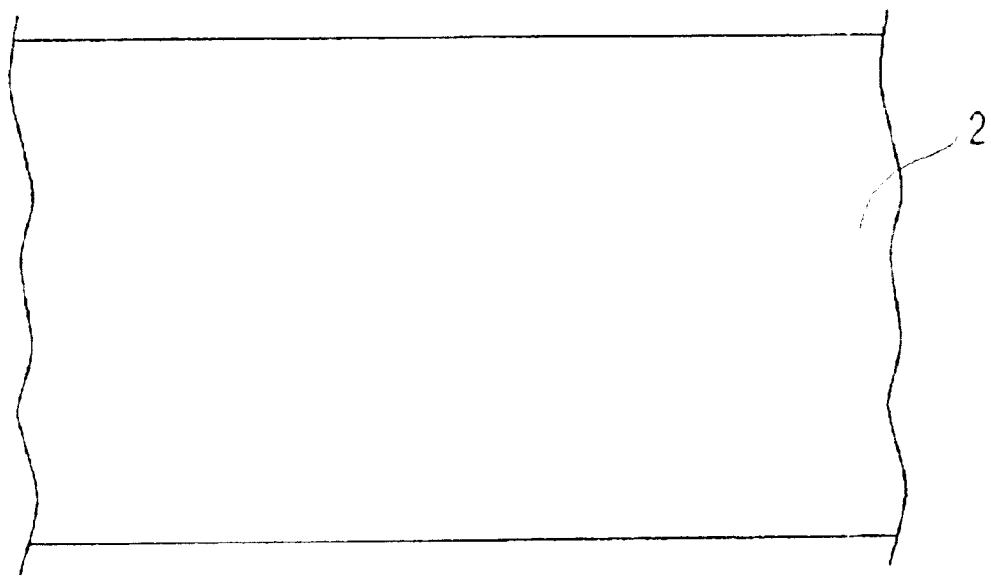
FIG. 11B is a plan view showing the buffer layer forming step in the process of fabricating the optical waveguide element of Example 1.

Next, this precursor solution for the buffer layer was spin coated on the surface of the Nb-doped $SrTiO_3$ (100) single crystal substrate 1 for which washing, etching and drying had been carried out. The temperature of the coated single crystal substrate was, in an $O_2$ atmosphere, raised and maintained at 350° C., and was then maintained at 800° C. Thereafter, the substrate was cooled. By repeating this several times, as shown in FIGS. 11A and 11B, the PLZT buffer layer 2 having a film thickness of 1.9 μm was solid phase epitaxially grown on the surface of the single crystal substrate 1.

Figure 12A:
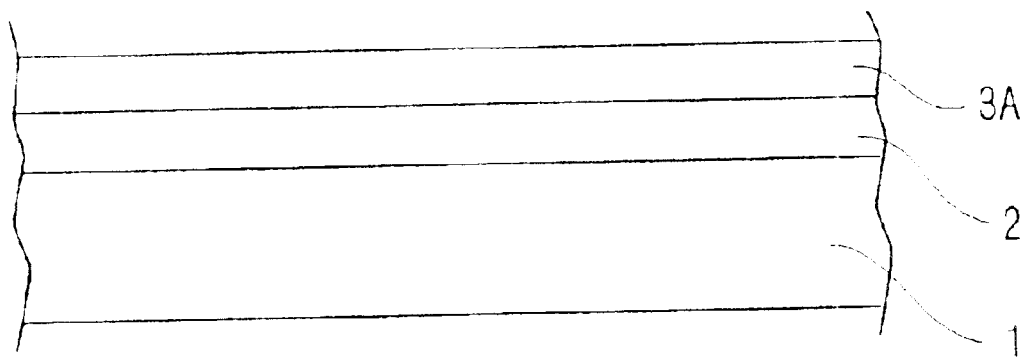
FIG. 12A is a cross-sectional view, along the light propagating direction, showing an optical waveguide layer forming step in the process of fabricating the optical waveguide element of Example 1.
Figure 12B:
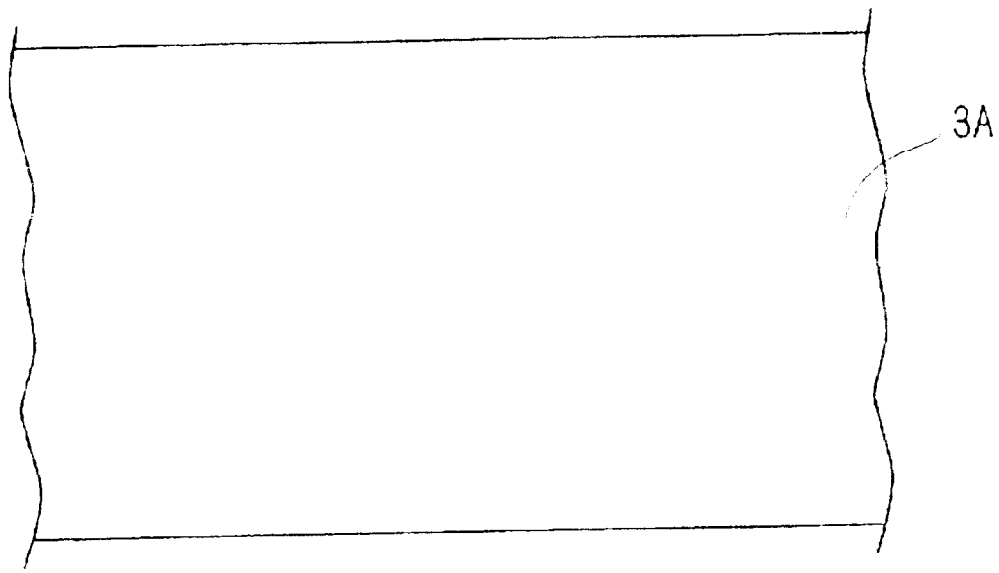
FIG. 12B is a plan view showing the optical waveguide layer forming step in the process of fabricating the optical waveguide element of Example 1.

Next, a precursor solution for the optical waveguide layer, for forming the PZT optical waveguide layer 3 of a composition having a refractive index of 2.468, was prepared in the same way as the precursor solution for the buffer layer. Then, this precursor solution for the optical waveguide layer was spin coated on the surface of the PLZT buffer layer 2. The temperature of the coated single crystal substrate was, in an $O_2$ atmosphere, raised and maintained at 350° C., and was then maintained at 800° C. Thereafter, the substrate was cooled. By repeating this coating, temperature raising, and cooling several times, as shown in FIGS. 12A and 12B, a PZT optical waveguide layer 3A having a thickness of 1.7 μm was solid phase epitaxially grown on the surface of the PLZT buffer layer 2.

Figure 13A:
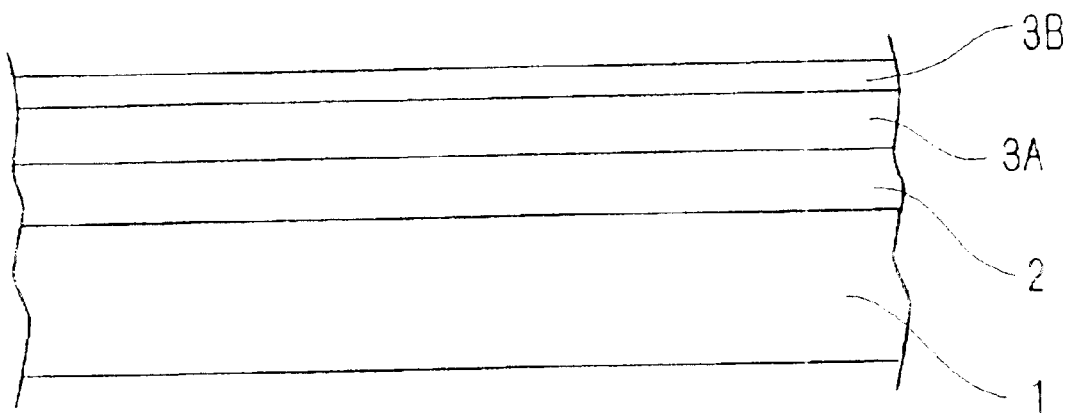
FIG. 13A is a cross-sectional view, along the light propagating direction, showing the continuation of the optical waveguide layer forming step in the process of fabricating the optical waveguide element of Example 1.
Figure 13B:
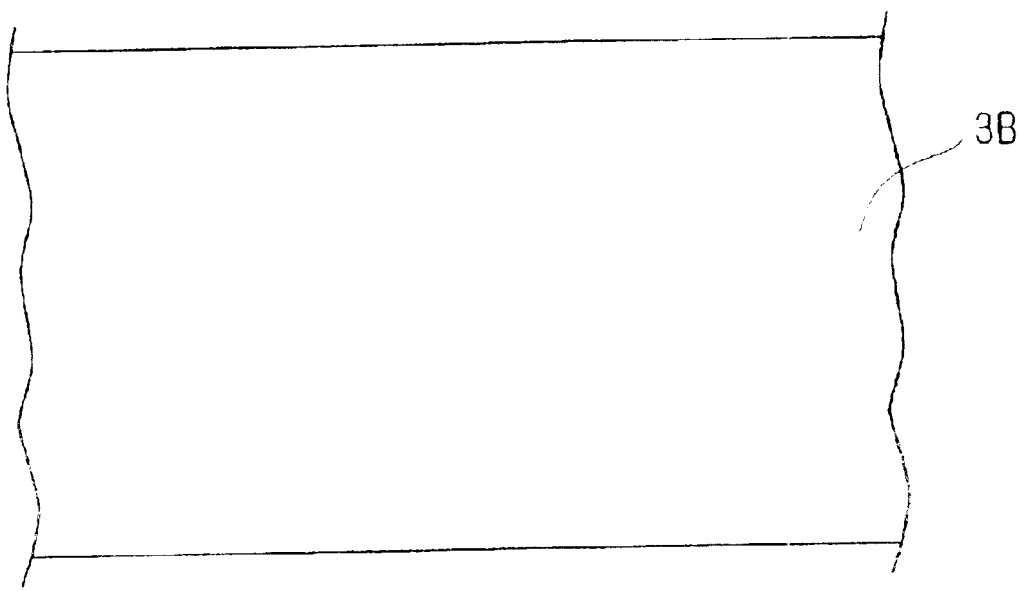
FIG. 13B is a plan view showing the continuation of the optical waveguide layer forming step in the process of fabricating the optical waveguide element of Example 1.

Next, the precursor solution for the optical waveguide layer was spin coated on the surface of the PZT optical waveguide layer 3A. The temperature of the coated single crystal substrate was, in an $O_2$ atmosphere, raised and maintained at 350° C., and thereafter, the substrate was cooled. By repeating this coating, temperature raising, and cooling several times, as shown in FIGS. 13A and 13B, an amorphous PZT optical waveguide layer 3B having a thickness of 0.5 μm was formed on the surface of the PZT optical waveguide layer 3A.

Next, a photoresist was spin coated and pre-baked, and thereafter, was exposed and developed. In this way, a resist pattern was formed in which, in units of respective elements, a taper portion having a taper length of 1000 μm was connected to each end of a linear portion, and a margin for working of 2000 μm was connected to the taper portion.

Next, after post-baking, wet etching was carried out by an HCl aqueous solution by using the resist as a mask. A convex, linear pattern was thereby formed on the amorphous PZT optical waveguide layer 3B. The etching in the depthwise direction was stopped at the surface of the PZT optical waveguide layer 3A which had been made epitaxial. The etching in the widthwise direction could be controlled by the etching time because the amorphous PZT optical waveguide layer 3B beneath the mask was under-etched. For example, by adjusting the etching time in accordance with an etching speed of about 0.1 μm/min to about 0.5 μm/min and stopping etching at the point when the width of the linear portion was 5.0 μm which was more narrow than the resist pattern, a ridge configuration having a height of 0.5 μm and a width at the linear portion of 5.0 μm could be formed. The amorphous PZT optical waveguide layer 3B, which was reshaped in a ridge-like configuration, was solid phase epitaxially grown. In this way, as shown in FIGS. 14A and 14B, the PZT optical waveguide layer 3 was completed in which, in units of respective elements, the ridge type channel optical waveguide 4 was formed which had a height of 0.5 μm, and at which a taper portion, whose width widened from 5 μm to 8 μm over a length of 1000 μm, was connected to each end portion of a linear portion having a width of 5.0 μm, and at which a linear channel, which had a width of 8 μm and which was to become the margin for working, was further connected. In this way, by carrying out reshaping in an amorphous state, it is possible to accurately process the configuration of the channel optical waveguide. Note that the position for cutting and dividing into units of the respective elements (i.e., the position at which the end surfaces are formed) is denoted by the one-dot chain line in FIG. 14B.

The mode field diameter, at the linear portion of a width of 5.0 μm of the channel optical waveguide 4, was 6.2 μm in the direction parallel to the substrate surface and 2.2 μm in the direction orthogonal to the substrate surface. The theoretical coupling loss with a single mode optical fiber having a mode field diameter of 9.5 μm was 4.2 dB.

Figure 15A:
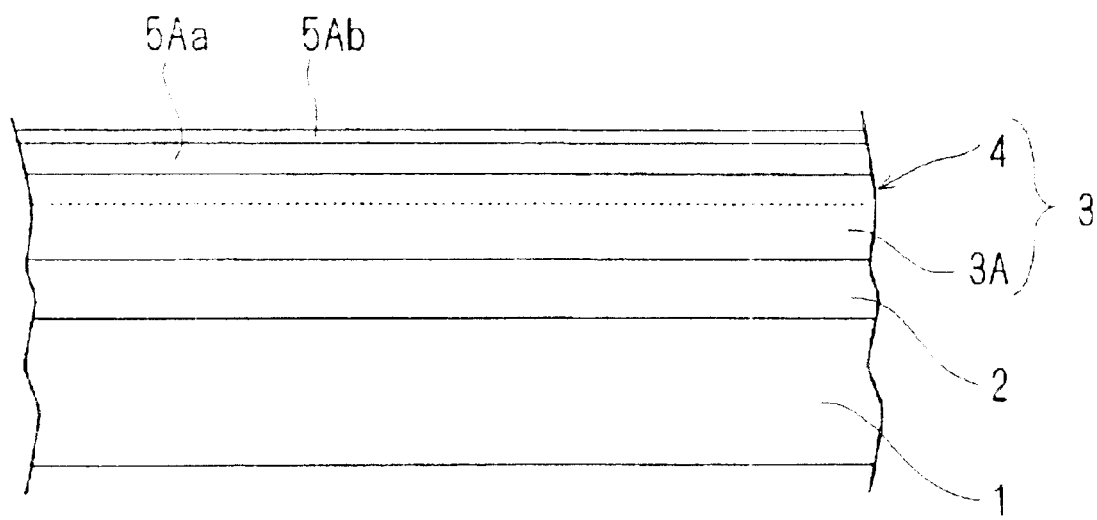
FIG. 15A is a cross-sectional view, along the light propagating direction, showing a cladding layer forming step in the process of fabricating the optical waveguide element of Example 1.
Figure 15B:
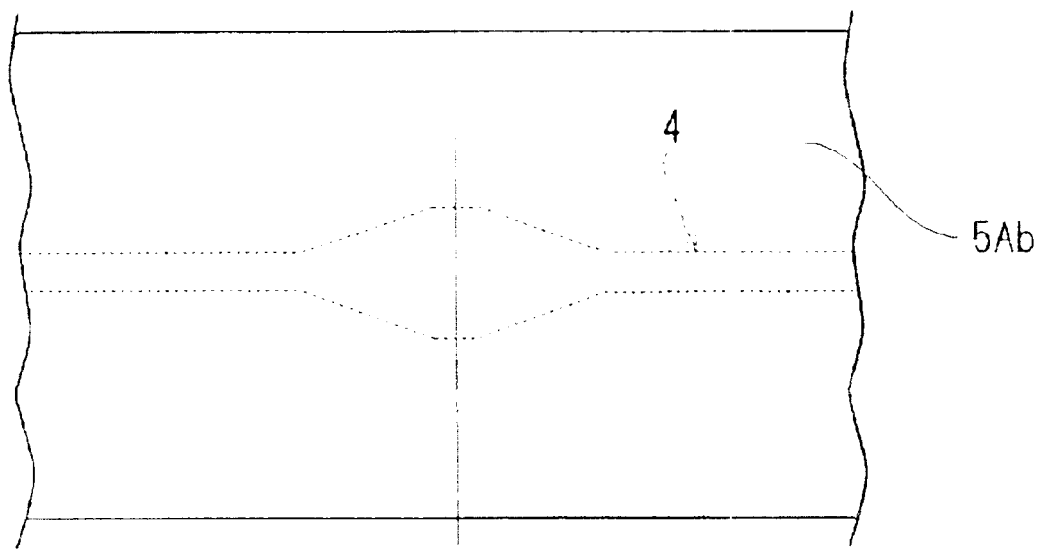
FIG. 15B is a plan view showing the cladding layer forming step in the process of fabricating the optical waveguide element of Example 1.

Next, a precursor solution for the cladding layer, which was for forming the PZT cladding layer 5 of a composition having a refractive index of 2.466, was prepared in the same way as the precursor solution for the buffer layer. This precursor solution for the cladding layer was spin coated on the surface of the PZT optical waveguide layer 3. In an $O_2$ atmosphere, the temperature was raised and maintained at 350° C., and thereafter, was cooled. By repeating this coating, temperature raising, and cooling several times, an amorphous PZT cladding layer 5Aa having a thickness of 2.4 μm was formed. The precursor solution, which was the same as the precursor solution used in preparing the amorphous PZT cladding layer 5Aa, was spin coated on the surface of the amorphous PZT cladding layer 5Aa. The temperature of the coated single crystal substrate was, in an $O_2$ atmosphere, raised and maintained at 250° C., and thereafter, the substrate was cooled. An amorphous PZT cladding layer 5Ab having a thickness of 0.1 μm was thereby formed. The amorphous PZT cladding layer 5Ab, which was made amorphous at a lower temperature, was easier to etch than the amorphous PZT cladding layer 5Aa, and etching proceeded from the top layer side. Thus, the amorphous PZT cladding layer 5Ab functioned as a taper formation promoting layer due to the side etching effect. In this way, as shown in FIGS. 15A and 15B, the amorphous PZT cladding layer 5Ab, which was a taper formation promoting layer, was formed on the surface of the amorphous PZT cladding layer 5Aa. Note that the total film thickness of the amorphous PZT cladding layer 5Aa and the amorphous PZT cladding layer 5Ab was 2.5 μm.

Figure 16A:
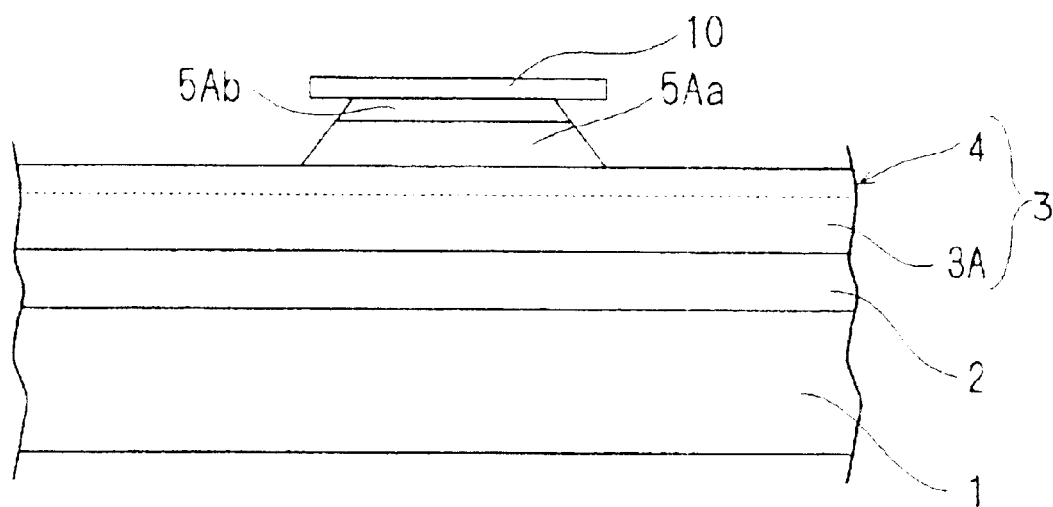
FIG. 16A is a cross-sectional view, along the light propagating direction, showing the continuation of a cladding layer reshaping step in the process of fabricating the optical waveguide element of Example 1.
Figure 16B:
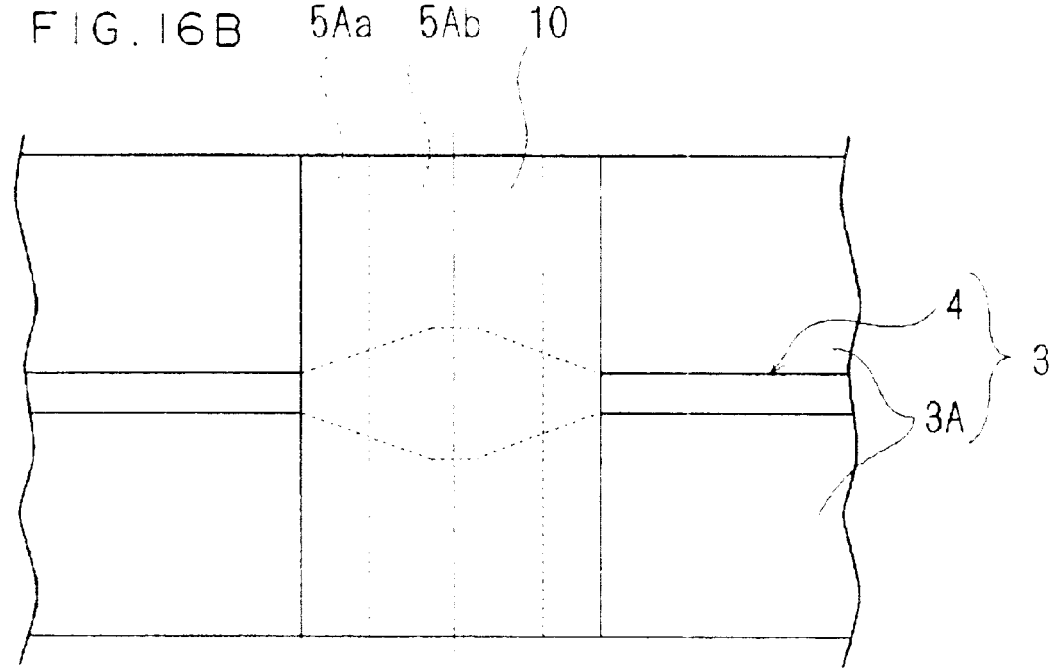
FIG. 16B is a plan view showing the continuation of the cladding layer reshaping step in the process of fabricating the optical waveguide element of Example 1.

Thereafter, a photoresist 10 was formed at a portion, of the channel optical waveguide 4, within 3000 μm from the position at which the substrate end surface was to be formed. When wet etching was carried out by an HCl aqueous solution by using the photoresist 10 as a mask, as shown in FIGS. 16A and 16B, among the amorphous PZT cladding layers 5Aa and 5Ab, the amorphous PZT cladding layer 5Ab which was the taper formation promoting layer was selectively side etched, and the amorphous PZT cladding layers 5Aa and 5Ab were reshaped in taper shapes whose thicknesses increased toward the end surfaces.

Figure 17A:
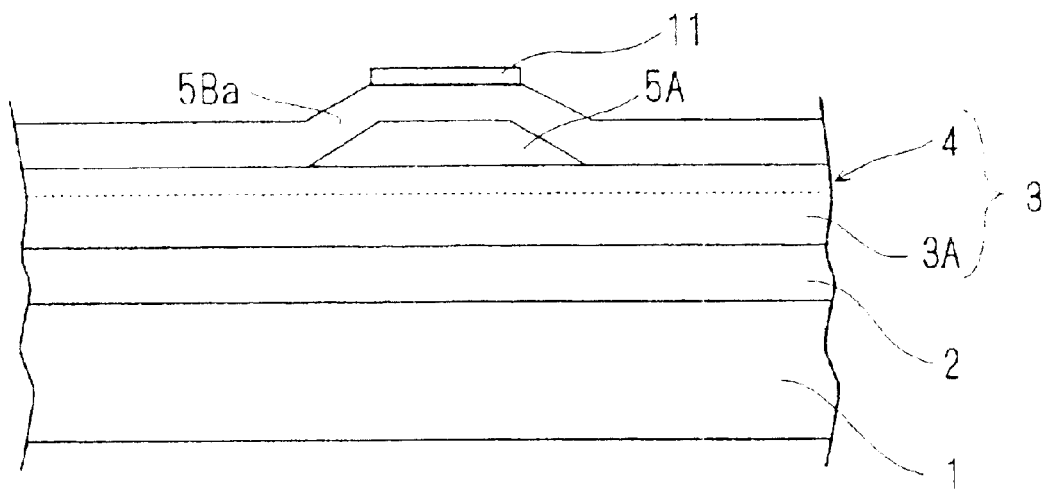
FIG. 17A is a cross-sectional view, along the light propagating direction, showing the continuation of the cladding layer reshaping step in the process of fabricating the optical waveguide element of Example 1.
Figure 17B:
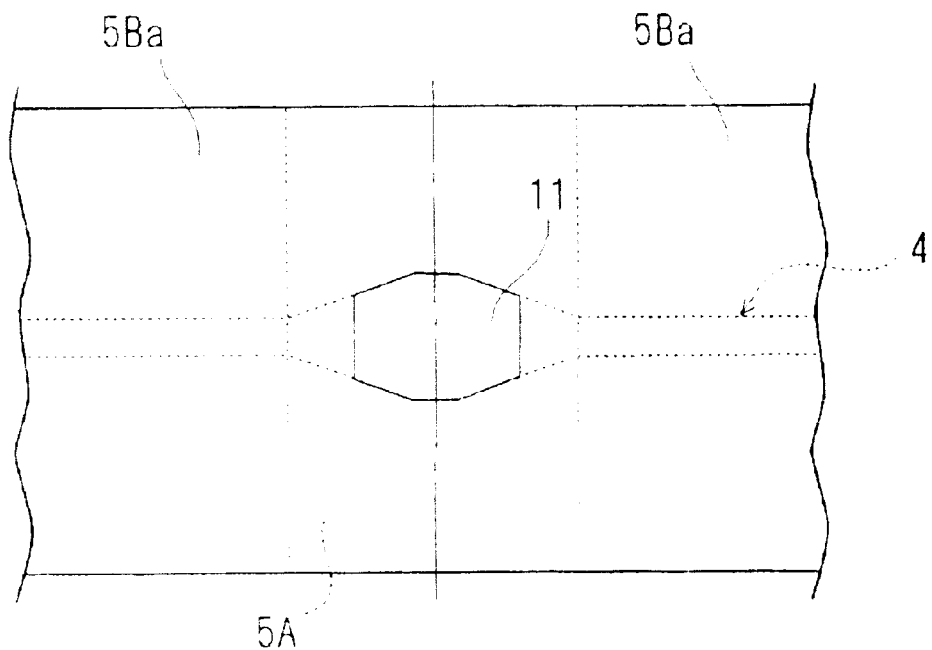
FIG. 17B is a plan view showing the continuation of the cladding layer reshaping step in the process of fabricating the optical waveguide element of Example 1.

Next, as shown in FIGS. 17A and 17B, the amorphous PZT cladding layers 5Aa and 5Ab were solid phase epitaxially grown to form a PZT cladding layer 5A. A precursor solution, which was the same as the precursor solution used in preparing the amorphous PZT cladding layer 5Aa, was spin coated on the surface of the PZT cladding layer 5A of which a portion was side etched. The temperature of the coated single crystal substrate was, in an $O_2$ atmosphere, raised and maintained at 250° C., and thereafter, the substrate was cooled. An amorphous PZT cladding layer 5Ba having a thickness of 2.5 μm was thereby formed. Thereafter, a photoresist 11 was formed at a portion which was above the taper portion and the margin for working of the channel optical waveguide 4 and which was within 3000 μm from the position at which the substrate end surface was to be formed.

Figure 18A:
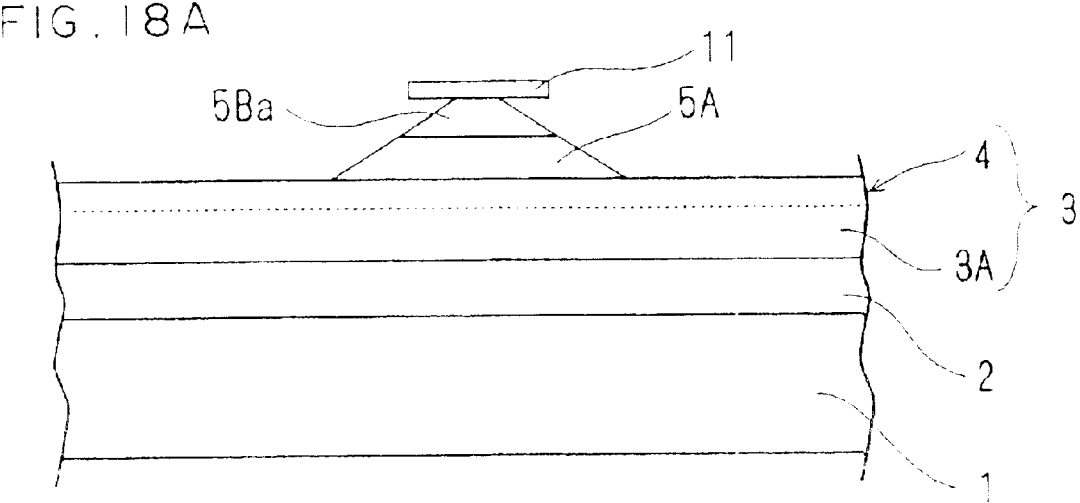
FIG. 18A is a cross-sectional view, along the light propagating direction, showing the continuation of the cladding layer reshaping step in the process of fabricating the optical waveguide element of Example 1.
Figure 18B:
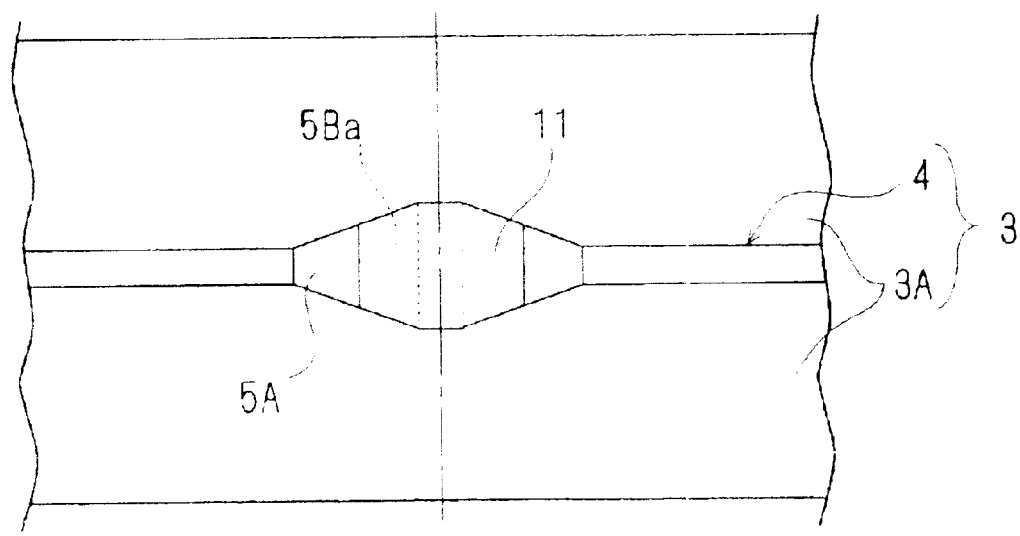
FIG. 18B is a plan view showing the continuation of the cladding layer reshaping step in the process of fabricating the optical waveguide element of Example 1.

Next, when wet etching by an HCl solution was carried out by using the photoresist 11 as a mask, as shown in FIGS. 18A and 18B, a portion of the amorphous PZT cladding layer 5Ba was side etched. The amorphous PZT cladding layer 5Ba was reshaped in a taper shape in which the thickness increased toward the end surface and the width increased toward the end surface.

Figure 19A:
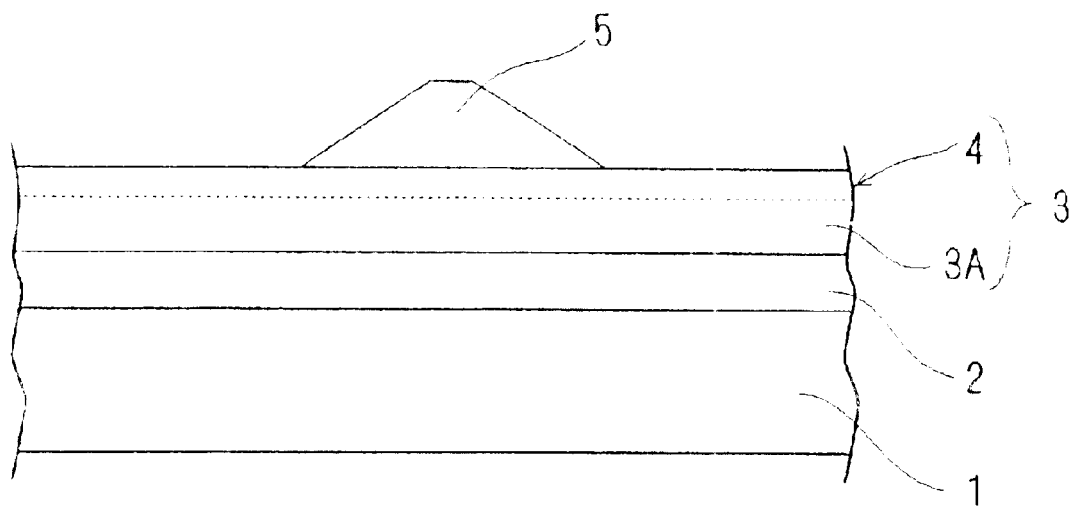
FIG. 19A is a cross-sectional view, along the light propagating direction, showing the continuation of the cladding layer reshaping step in the process of fabricating the optical waveguide element of Example 1.
Figure 19B:
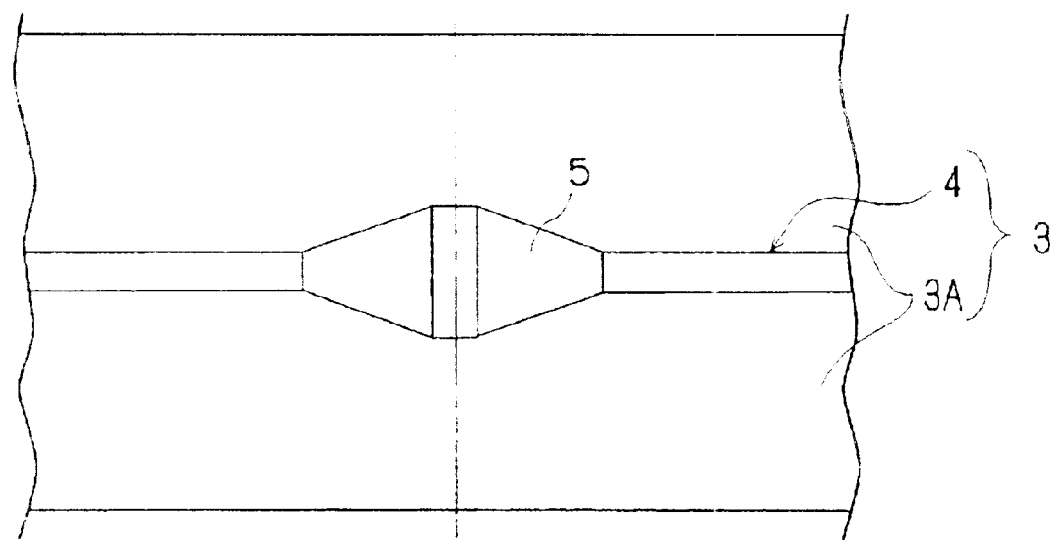
FIG. 19B is a plan view showing the continuation of the cladding layer reshaping step in the process of fabricating the optical waveguide element of Example 1.

Next, as shown in FIGS. 19A and 19B, by solid phase epitaxially growing the amorphous PZT cladding layer 5Ba, the amorphous PZT cladding layer 5Ba became integral with the PZT cladding layer 5A which had been reshaped in a taper shape. In the same way as the channel optical waveguide 4, the taper-shaped PZT cladding layer 5, which was structured by a margin for working of a width of 8 μm and a taper portion whose width increased from 5 μm to 8 μm along a length of 1000 μm, was formed.

Finally, the substrate on which the respective layers were formed was cut into units of respective elements, and the end surfaces thereof were polished. As shown in FIGS. 20A and 20B, optical waveguide elements, at which taper-shaped cladding layers 5 having an end surface thickness of 5 μm and an end surface cladding width of 8 μm were formed above each of the light entering end portion and the light exiting end portion of the channel optical waveguide 4, were completed.

The crystallographic relationship of the obtained optical waveguide element was a single-oriented PZT (100) cladding layer//PZT (100) optical waveguide layer//PLZT (100) buffer layer//Nb-doped $SrTiO_3$ (100) substrate. The in-plane orientation had the following structure: PZT [001] cladding layer//PZT [001] optical waveguide layer//PLZT [001] buffer layer//Nb-doped $SrTiO_3$ [001] substrate.

Single mode optical fibers having a mode field diameter of 9.5 μm were disposed at the light entering and light exiting ends of the obtained optical waveguide element, and the insertion loss between the optical fibers was determined. By subtracting the light propagation loss due to the channel optical waveguide from the insertion loss, the coupling loss between the optical waveguide and the optical fiber was determined and found to be 1.1 dB. It was confirmed that, as compared with a coupling loss of 4.2 dB in a case in which the taper portions were not provided at the end portions of the channel optical waveguide and the taper-shaped cladding layers were not provided, the coupling loss could be greatly reduced.

Example 2

The present Example describes an example of fabricating an optical waveguide element having the structure shown in FIG. 1 in which the PLZT buffer layer 2 having a refractive index of 2.416, the PZT optical waveguide layer 3 having a refractive index of 2.442, and the PZT cladding layers 5 having a refractive indices of 2.441 are formed on the single crystal substrate 1 formed from Nb-doped $SrTiO_3$ (100) having a refractive index of 2.284. Note that, in the present Example, the refractive indices of the respective layers are refractive indices with respect to light of a wavelength of 1.55 μm.

Anhydrous lead acetate $Pb(CH_3COO)_2$, lanthanum isopropoxide $La(O-i-C_3H_7)_3$, zirconium isopropoxide $Zr(O-i-C_3H_7)_4$, and titanium isopropoxide $Ti(O-i-C_3H_7)_4$ were used as the starting materials. These starting materials were dissolved in 2-methoxyethanol, and thereafter, the solution was distilled and refluxed. Finally, a precursor solution for the buffer layer, for forming the PLZT buffer layer of a composition having a refractive index of 2.416 and a Pb concentration of 0.6 M, was prepared.

Figure 21A:
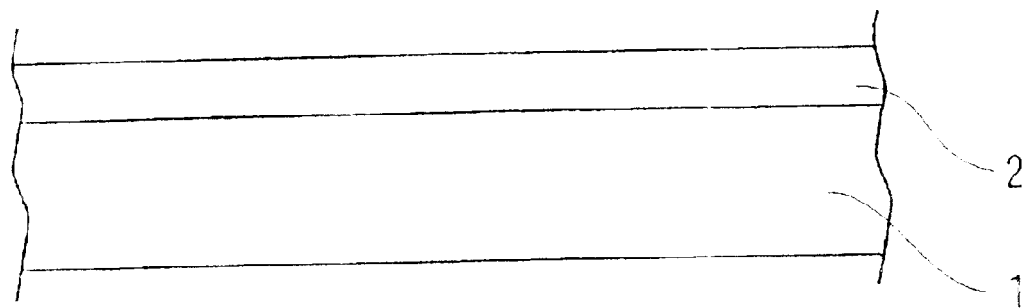
FIG. 21A is a cross-sectional view, along a light propagating direction, showing a buffer layer forming step in a process of fabricating an optical waveguide element of Example 2.
Figure 21B:
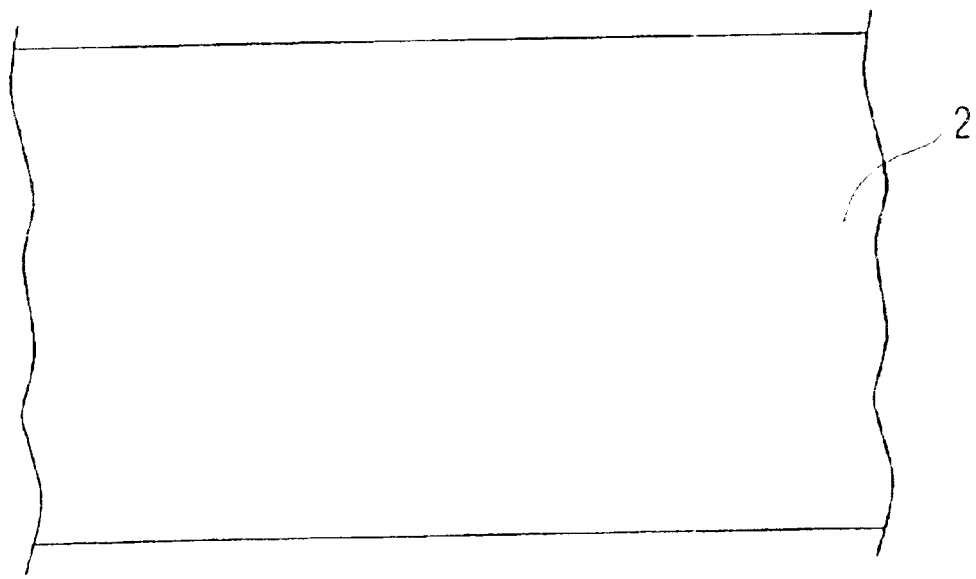
FIG. 21B is a plan view showing the buffer layer forming step in the process of fabricating the optical waveguide element of Example 2.

Next, this precursor solution for the buffer layer was spin coated on the surface of the Nb-doped $SrTiO_3$ (100) single crystal substrate/for which washing, etching and drying had been carried out. The temperature of the coated single crystal substrate was, in an $O_2$ atmosphere, raised and maintained at 350° C., and was then maintained at 800° C. Thereafter, the substrate was cooled. By repeating this several times, as shown in FIGS. 21A and 21B, the PLZT buffer layer 2 having a film thickness of 2.6 μm was solid phase epitaxially grown on the surface of the single crystal substrate 1.

Figure 22A:
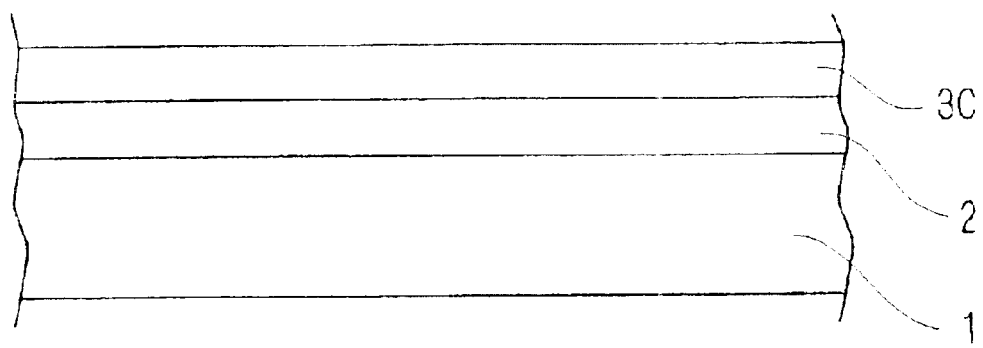
FIG. 22A is a cross-sectional view, along the light propagating direction, showing an optical waveguide layer forming step in the process of fabricating the optical waveguide element of Example 2.
Figure 22B:
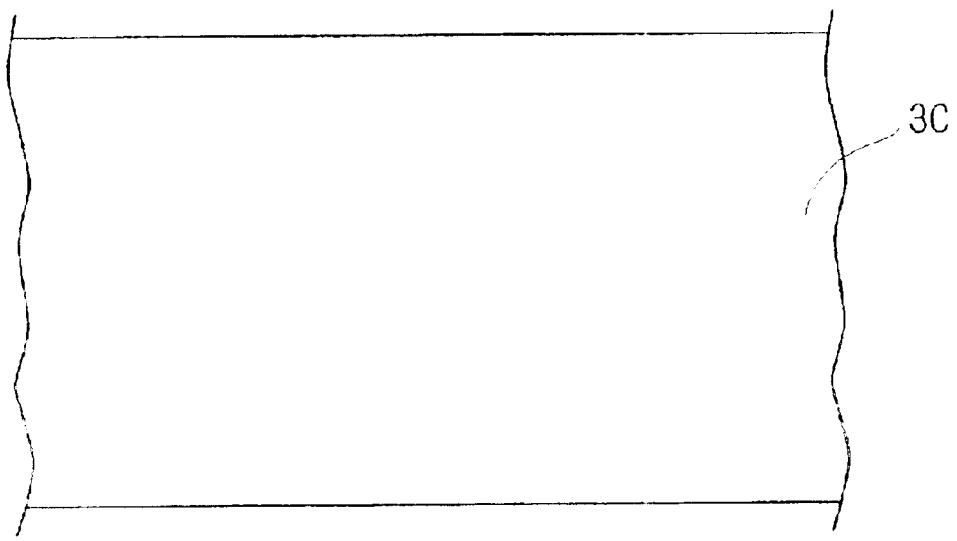
FIG. 22B is a plan view showing the optical waveguide layer forming step in the process of fabricating the optical waveguide element of Example 2.

Next, a precursor solution for the optical waveguide layer, for forming the PZT optical waveguide layer 3 of a composition having a refractive index of 2.442, was prepared in the same way as the precursor solution for the buffer layer. Then, this precursor solution for the optical waveguide layer was spin coated on the surface of the PLZT buffer layer 2. The temperature of the coated single crystal substrate was, in an $O_2$ atmosphere, raised and maintained at 350° C., and was then maintained at 800° C. Thereafter, the substrate was cooled. By repeating this coating, temperature raising, and cooling several times, as shown in FIGS. 22A and 22B, a slab type PZT optical waveguide layer 3C having a thickness of 2.2 μm was solid phase epitaxially grown on the surface of the PLZT buffer layer 2.

Figure 23A:
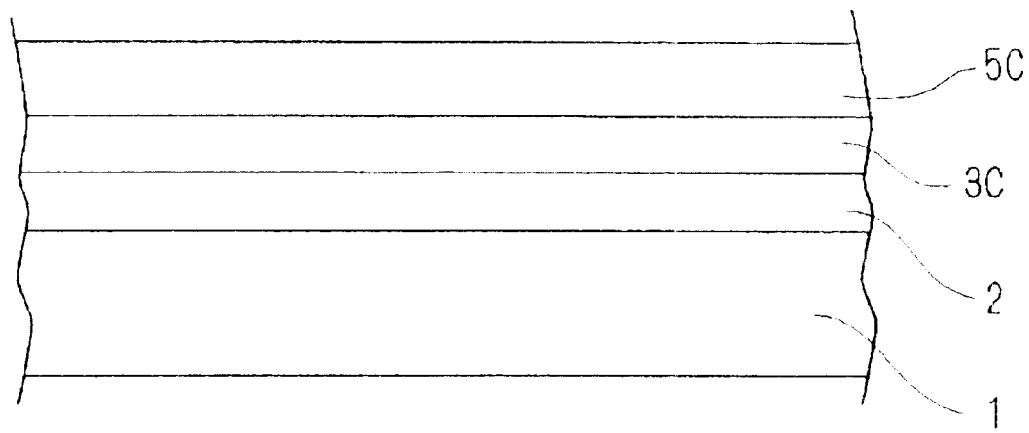
FIG. 23A is a cross-sectional view, along the light propagating direction, showing the continuation of a cladding layer forming step in the process of fabricating the optical waveguide element of Example 2.
Figure 23B:
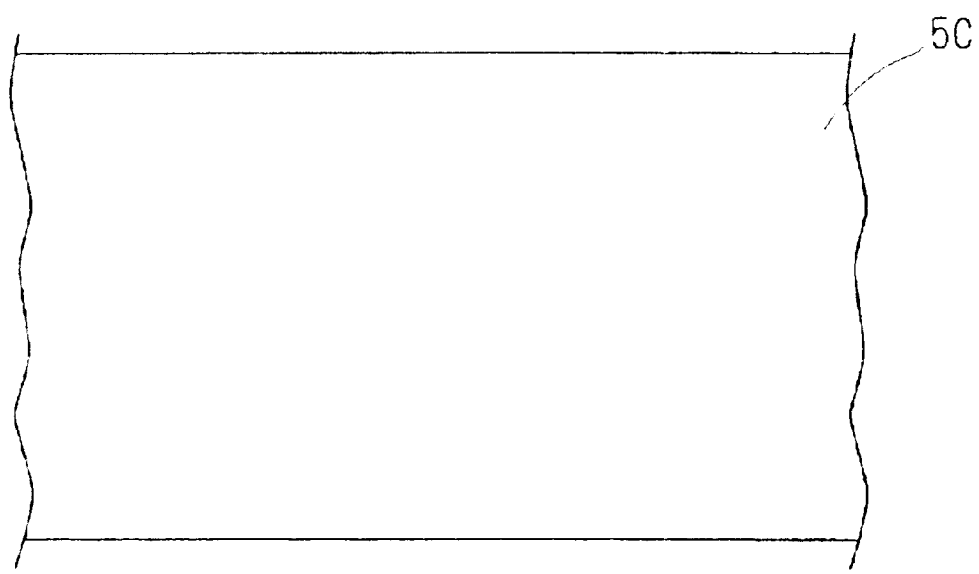
FIG. 23B is a plan view showing the continuation of the cladding layer forming step in the process of fabricating the optical waveguide element of Example 2.

Next, a precursor solution for the cladding layer, which was for forming the PZT cladding layer 5 of a composition having a refractive index of 2.441, was prepared in the same way as the precursor solution for the buffer layer. Then, this precursor solution for the cladding layer was spin coated on the surface of the slab type PZT optical waveguide layer 3C. The temperature of the coated single crystal substrate was, in an $O_2$ atmosphere, raised and maintained at 350° C., and was then maintained at 800° C. Thereafter, the substrate was cooled. By repeating this coating, temperature raising, and cooling several times, as shown in FIGS. 23A and 23B, a slab type PZT cladding layer 5C having a thickness of 5.0 $\mu$m was solid phase epitaxially grown on the surface of the slab type PZT optical waveguide layer 3C.

Figure 24A:
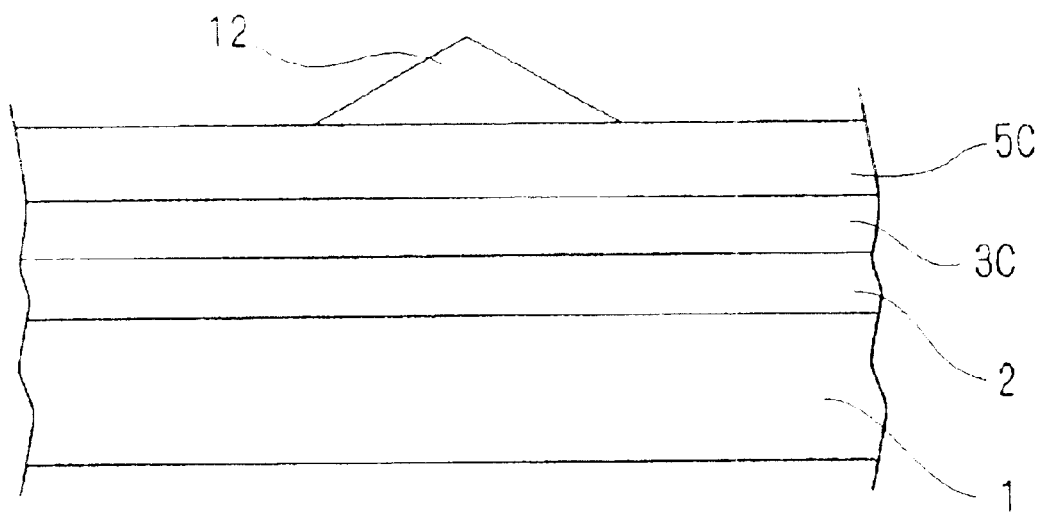
FIG. 24A is a cross-sectional view, along the light propagating direction, showing a cladding layer reshaping step in the process of fabricating the optical waveguide element of Example 2.
Figure 24B:
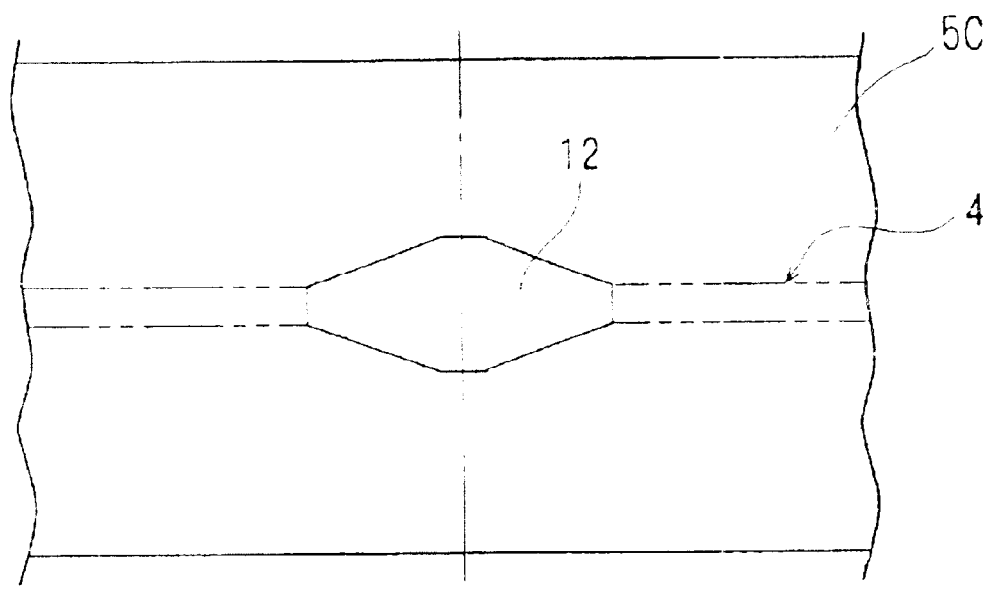
FIG. 24B is a plan view showing the cladding layer reshaping step in the process of fabricating the optical waveguide element of Example 2.

Next, as shown in FIGS. 24A and 24B, a photoresist 12, whose film thickness decreased from the end surface forming position toward the inner sides, was formed, in units of the respective elements, on the portions of the slab type PZT cladding layer 5C existing above the positions at which the taper portions and the margins for working of the channel optical waveguides 4 were to be formed. Note that the positions at which the channel optical waveguides 4 are to be formed are shown by the two-dot chain lines in FIG. 24B, and the position for cutting and separating into the respective element units (the end surface forming position) is shown by the one-dot chain line in FIG. 24B. In this way, a photoresist, whose film thickness gradually varies, can be prepared by varying the amount of exposure of the resist by a gray scale.

Figure 25A:
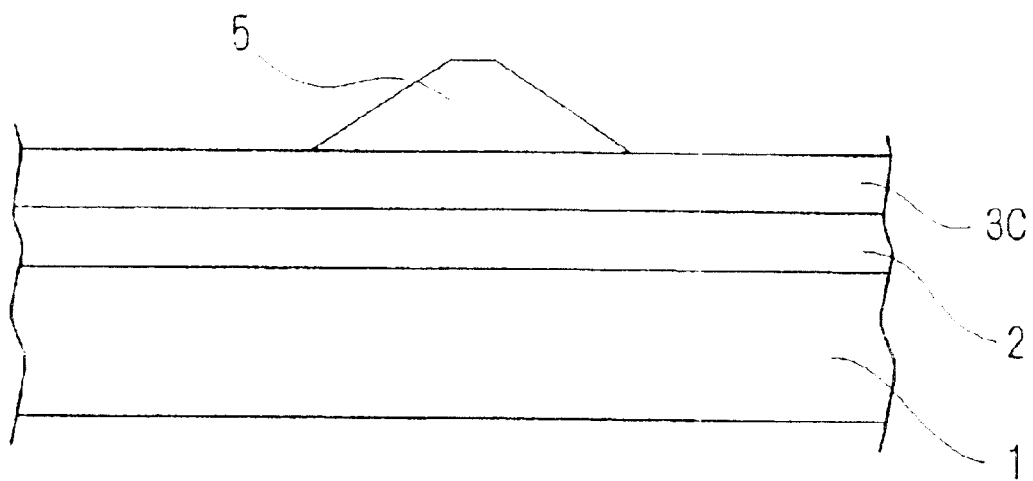
FIG. 25A is a cross-sectional view, along the light propagating direction, showing the continuation of the cladding layer reshaping step in the process of fabricating the optical waveguide element of Example 2.
Figure 25B:
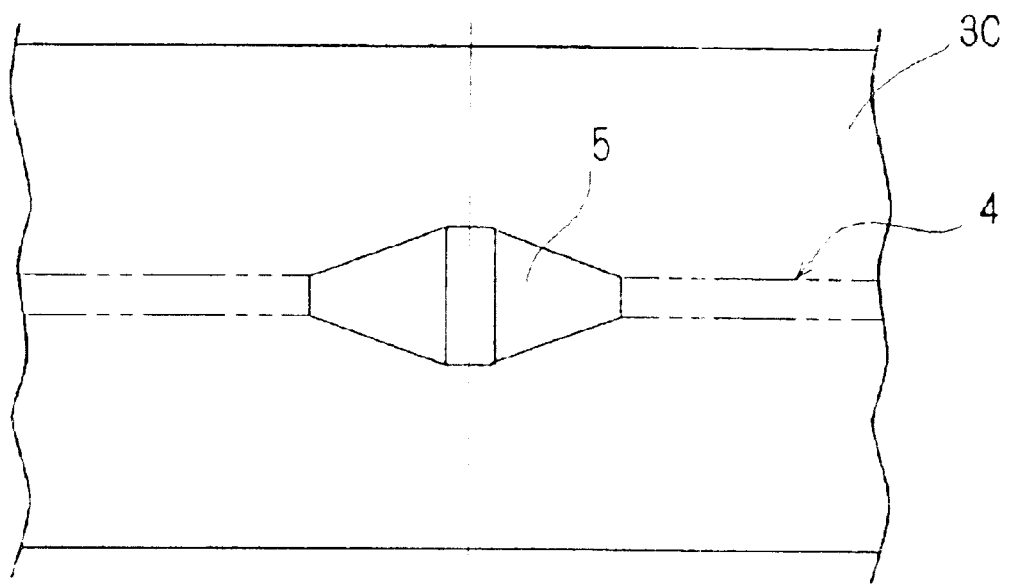
FIG. 25B is a plan view showing the continuation of the cladding layer reshaping step in the process of fabricating the optical waveguide element of Example 2.

Next, as shown in FIGS. 25A and 25B, dry etching was carried out by using the photoresist 12 as a mask. In this way, the slab type PZT cladding layer 5C was reshaped into a taper shape whose thickness increased toward the end surface and whose width increased toward the end surface. For units of respective elements, the taper-shaped PZT cladding layers 5 were formed in which the taper portion, whose width increased from 5 $\mu$m to 12 $\mu$m over a length of 500 $\mu$m, was connected to each end portion of the linear portion having a width of 5.0 $\mu$m, and a margin for working having a width of 12 $\mu$m was further connected.

The taper-shaped PZT cladding layer 5, at the end surface side thereof, had a width of 12 $\mu$m and a thickness of 5 $\mu$m, and at the inner portion side thereof, had a width of 5 $\mu$m and a thickness of 0 $\mu$m. In this way, the taper-shaped PZT cladding layer 5, which had substantially the same width as the channel optical waveguide 4, was formed above each of the positions at which the light entering end portion and the light exiting end portion of the channel optical waveguide 4 were to be formed. At the region at which the taper-shaped PZT cladding layers 5 were not formed, the surface of the slab type PZT optical waveguide layer 3C was exposed.

Even if, instead of etching using the photoresist whose film thickness varies, dry etching is carried out by placing a shadow mask between the cladding layer via a spacer and gradually moving this shadow mask, it is possible to reshape the slab type PZT cladding layer into a taper shape whose thickness increases toward the end surface.

Figure 26A:
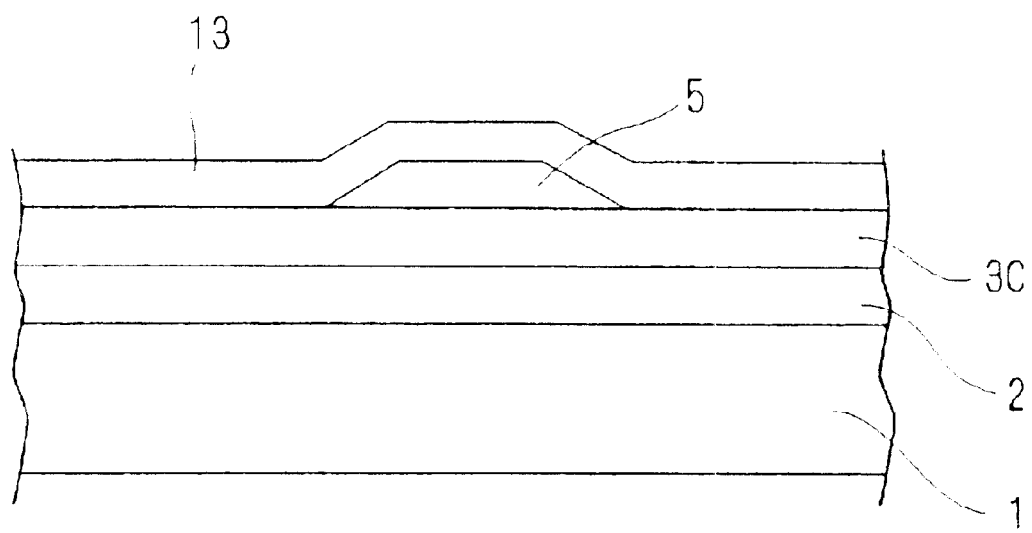
FIG. 26A is a cross-sectional view, along the light propagating direction, showing a channel optical waveguide forming step in the process of fabricating the optical waveguide element of Example 2.
Figure 26B:
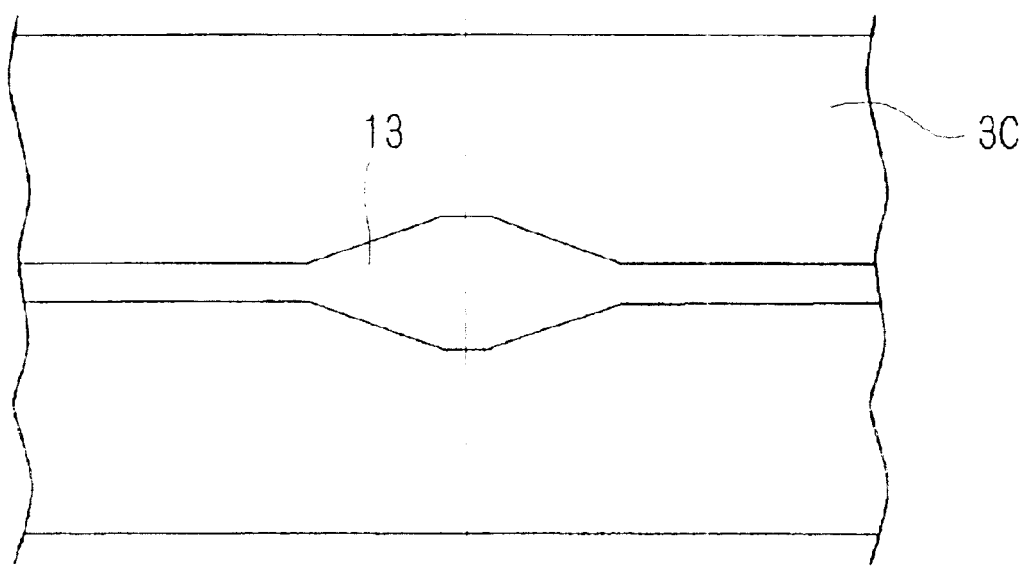
FIG. 26B is a plan view showing the channel optical waveguide forming step in the process of fabricating the optical waveguide element of Example 2.
Figure 27A:
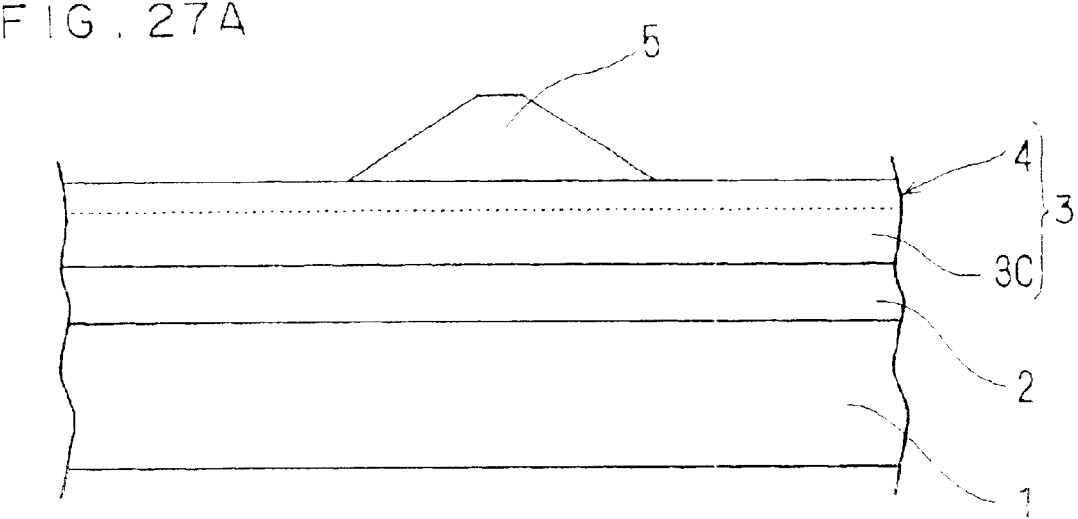
FIG. 27A is a cross-sectional view, along the light propagating direction, showing the continuation of the channel optical waveguide forming step in the process of fabricating the optical waveguide element of Example 2.
Figure 27B:
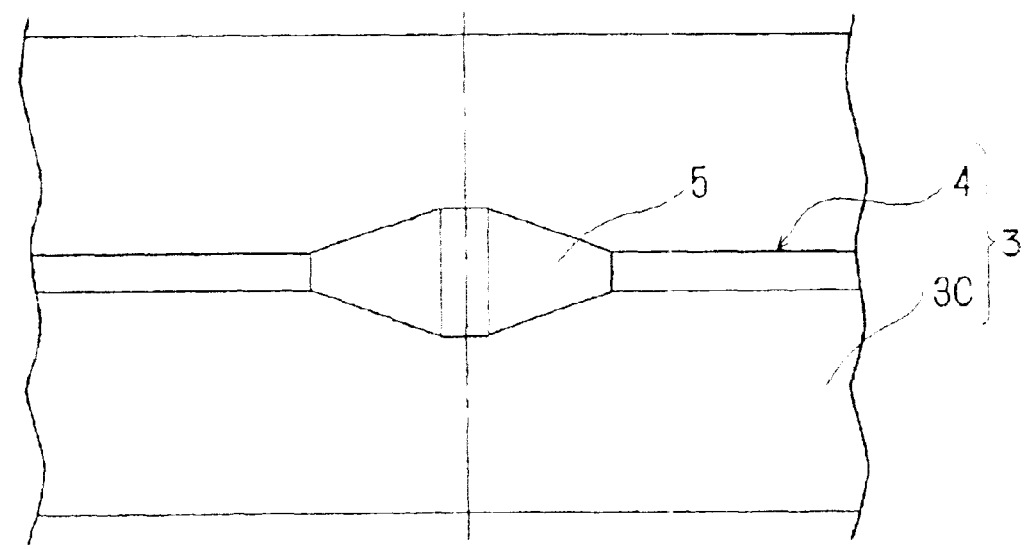
FIG. 27B is a plan view showing the continuation of the channel optical waveguide forming step in the process of fabricating the optical waveguide element of Example 2.

Next, as shown in FIGS. 26A and 26B, a photoresist 13 was formed above the position at which the channel optical waveguide 4 was to be formed. Then, as shown in FIGS. 27A and 27B, by using the photoresist 13 as a mask, dry etching was carried out from the surface of the slab type PZT optical waveguide layer 3C to a depth of 0.5 $\mu$m. For units of respective elements, the ridge type channel optical waveguide 4 was formed which had a height of 0.5 $\mu$m, and at which the taper portion, whose channel width increased from 5 $\mu$m to 12 $\mu$m over a length of 500 $\mu$m, was connected to each end portion of the linear portion having a width of 5.0 $\mu$m, and at which a linear channel, which had a width of a 12 $\mu$m and which was to become the margin for working, was further connected to the taper portion.

Figure 28A:
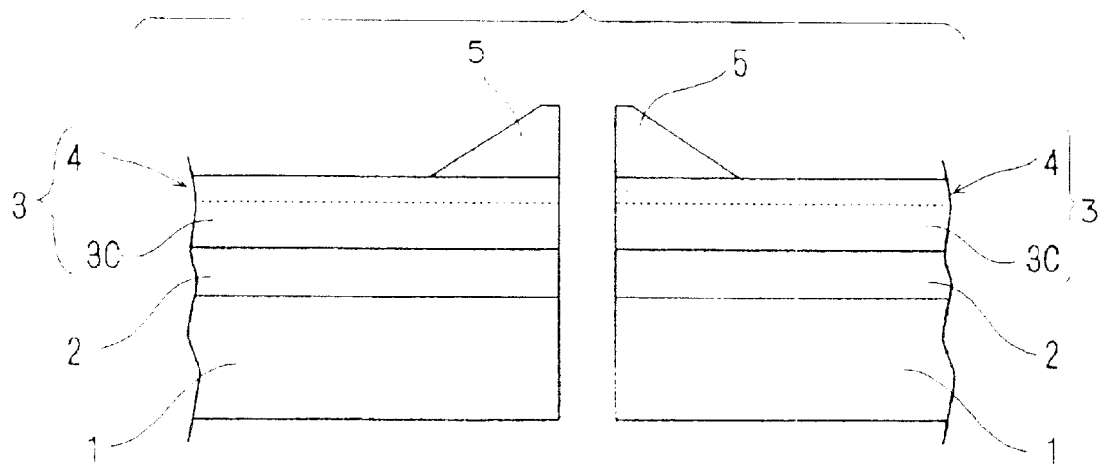
FIG. 28A is a cross-sectional view, along the light propagating direction, showing a device isolation step in the process of fabricating the optical waveguide element of Example 2.
Figure 28B:
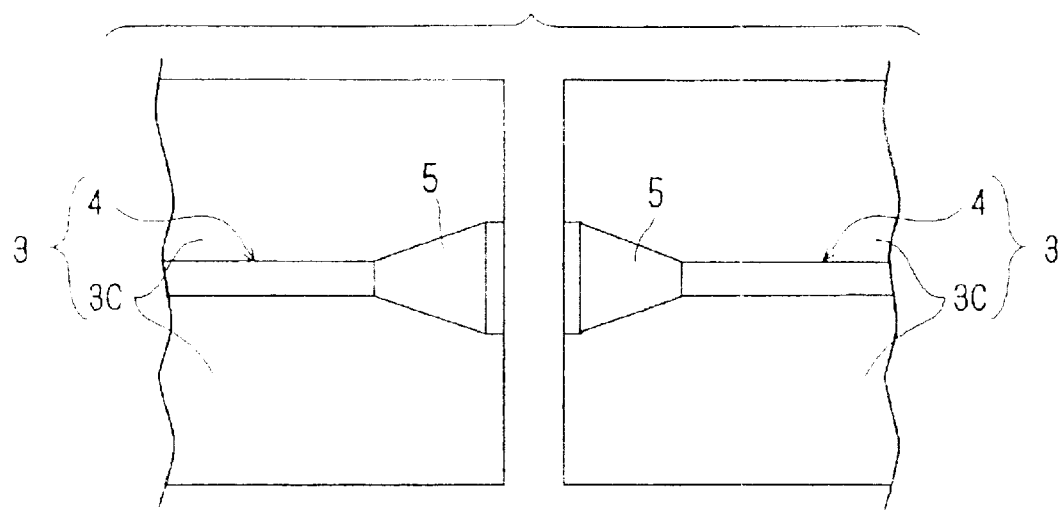
FIG. 28B is a plan view showing the device isolation step in the process of fabricating the optical waveguide element of Example 2.

Finally, the substrate on which the respective layers were formed was cut into units of respective elements, and the end surfaces thereof were polished. As shown in FIGS. 28A and 28B, optical waveguide elements, at which taper-shaped cladding layers 5 having an end surface thickness of 5 $\mu$m and an end surface cladding width of 12 $\mu$m were formed above each of the light entering end portion and the light exiting end portion of the channel optical waveguide 4, were completed.

The crystallographic relationship of the obtained optical waveguide element was a single-oriented PZT (100) cladding layer//PZT (100) optical waveguide layer//PLZT (100) buffer layer//Nb-doped $SrTiO_3$ (100) substrate. The in-plane orientation had the following structure: PZT [001] cladding layer//PZT [001] optical waveguide layer//PLZT [001] buffer layer//Nb-doped $SrTiO_3$ [001] substrate.

The mode field diameter, at the light entering and light exiting ends of widths of 12.0 $\mu$m of the channel optical waveguide 4 of the optical waveguide element, was 9.4 $\mu$m in the direction 4 parallel to the substrate surface and 6.2 $\mu$m in the direction orthogonal to the substrate surface. The theoretical coupling loss with a single mode optical fiber having a mode field diameter of 9.5 $\mu$m was 0.7 dB. On the other hand, the mode field diameter, at the linear portion having a width of 5.0 $\mu$m of the channel optical waveguide 4 at which no cladding layer was formed, was 7.2 $\mu$m in the direction parallel to the substrate surface and 2.6 $\mu$m in the direction orthogonal to the substrate surface. The theoretical coupling loss with a single mode optical fiber having a mode field diameter of 9.5 $\mu$m was 3.1 dB.

Single mode optical fibers having a mode field diameter of 9.5 $\mu$m were disposed at the light entering and light exiting ends of the obtained optical waveguide element, and the insertion loss between the optical fibers was determined. By subtracting the light propagation loss due to the channel optical waveguide from the insertion loss, the coupling loss between the optical waveguide and the optical fiber was determined and found to be 0.8 dB. As compared with a coupling loss of 3.1 dB in a case in which the taper portions were not provided at the end portions of the channel optical waveguide and the taper-shaped cladding layers were not provided, the coupling loss could be greatly reduced.

What is claimed is:

1. An optical waveguide element comprising:
  an optical waveguide layer having a ridge type channel optical waveguide; and
  a cladding layer provided above at least one of a light entering end portion and a light exiting end portion of the channel optical waveguide of a surface of the optical waveguide layer, the cladding layer having substantially the same width as the channel optical waveguide, and having a refractive index which is smaller than a refractive index of the optical waveguide layer, and having a tapered configuration in which a thickness of the cladding layer increases toward an end surface and the width of the channel optical waveguide is increasing at the end surface.

2. The optical waveguide element of claim 1, wherein a difference in refractive indices of the optical waveguide layer and the cladding layer is from 0.001 or more to 0.05 or less.

3. The optical waveguide element of claim 1, wherein a width, of the channel optical waveguide, at at least one of the light entering end portion and the light exiting end portion increases toward the end surface.

4. The optical waveguide element of claim 3, wherein a width, of the channel optical waveguide, at an end portion is 5 µm or more.

5. The optical waveguide element of claim 1, wherein a thickness, of the cladding layer, at an end portion is 1 µm or more.

6. The optical waveguide element of claim 1, wherein a length of a taper-shaped section of the cladding layer is from 50 µm or more to 5000 µm or less.

7. The optical waveguide element of claim 1, wherein at least one of the optical waveguide layer and the cladding layer is formed of an oxide which has been epitaxially grown.

8. The optical waveguide element of claim 1, wherein at least one of the optical waveguide layer and the cladding layer is formed of a ferroelectric having an electro-optical effect.

9. The optical waveguide element of claim 1, wherein at least one of the optical waveguide layer and the cladding layer is formed from $Pb_{1-x}La_x(Zr_yTi_{1-y})_{1-x/4}O_3$ ($0<x<0.3$, $0<y<0$).

10. The optical waveguide element of claim 1, wherein the optical waveguide layer is formed on a single crystal substrate via a buffer layer having a refractive index which is smaller than a refractive index of the optical waveguide layer.

11. The optical waveguide element of claim 10, wherein the single crystal substrate is formed by an $SrTiO_3$ substrate doped with an impurity element.

12. A method of fabricating an optical waveguide element, comprising the steps of:
  (a) forming, on a surface of an optical waveguide layer having a ridge type channel optical waveguide and formed by epitaxial growth, an amorphous thin film whose refractive index after epitaxial growth is smaller than a refractive index of the optical waveguide layer;
  (b) reshaping the amorphous thin film such that a taper-shaped portion, which has substantially the same width as a width of a channel optical waveguide and has a thickness which increases toward an end surface, remains above at least one of a light entering end portion and a light exiting end portion of the channel optical waveguide; and
  (c) forming a taper type cladding layer by solid phase epitaxially growing the reshaped amorphous thin film by heating the reshaped amorphous thin film.

13. The method of claim 12, wherein the step (b) of reshaping includes the sub-steps of:
  (i) forming a resist film having a specific opening pattern, on the amorphous thin film; and
  (ii) etching the amorphous thin film by using the resist film.

14. The method of claim 13, wherein the sub-step (ii) of etching is carried out in a state in which a taper formation promoting layer, whose speed of being etched is greater than a speed of being etched of the amorphous thin film, is provided between the amorphous thin film and the resist film.

15. The method of claim 13, wherein the etching is carried out by a wet etching method.

16. A method of fabricating an optical waveguide element, comprising the steps of:
  (a) forming, by epitaxial growth and on a surface of a slab type optical waveguide layer formed by epitaxial growth, a slab type cladding layer whose refractive index is smaller than a refractive index of the optical waveguide layer;
  (b) forming a taper type cladding layer by reshaping the slab type cladding layer such that a taper-shaped portion, which has substantially the same width as a width of a channel optical waveguide and has a thickness which increases toward an end surface, remains above at least one of a light entering end portion and a light exiting end portion at which the channel optical waveguide is to be formed; and
  (c) forming a ridge type channel optical waveguide by reshaping the slab type optical waveguide layer into a predetermined channel pattern having a width that is increasing at the end surface.

17. The method of claim 16, wherein the step (b) of forming the cladding layer includes the sub-steps of:
  (i) forming, on the slab type cladding layer, a resist film which has a specific opening pattern and whose film thickness varies gradually; and
  (ii) etching the slab type cladding layer by using the resist film.

18. The method of claim 16, wherein the etching is carried out by using a dry etching method.

19. An optical waveguide element comprising:
  an optical waveguide layer having a ridge type channel optical waveguide; and
  a cladding layer provided above at least one of a light entering end portion and a light exiting end portion of the channel optical waveguide of a surface of the optical waveguide layer, the cladding layer having substantially the same width as the channel optical waveguide, and having a refractive index which is smaller than a refractive index of the optical waveguide layer, and having a tapered configuration in which a thickness of the cladding layer increases toward an end surface,
  wherein a difference in refractive indices of the optical waveguide layer and the cladding layer is from 0.001 or more to 0.05 or less.

20. An optical waveguide element comprising:
  an optical waveguide layer having a ridge type channel optical waveguide; and
  a cladding layer provided above at least one of a light entering end portion and a light exiting end portion of the channel optical waveguide of a surface of the optical waveguide layer, the cladding layer having substantially the same width as the channel optical waveguide, and having a refractive index which is smaller than a refractive index of the optical waveguide layer, and having a tapered configuration in which a thickness of the cladding layer increases toward an end surface,
  wherein at least one of the optical waveguide layer and the cladding layer is formed of a ferroelectric having an electro-optical effect.

21. An optical waveguide element comprising:
  an optical waveguide layer having a ridge type channel optical waveguide; and
  a cladding layer provided above at least one of a light entering end portion and a light exiting end portion of the channel optical waveguide of a surface of the optical waveguide layer, the cladding layer having substantially the same width as the channel optical waveguide, and having a refractive index which is smaller than a refractive index of the optical waveguide layer, and having a tapered configuration in which a thickness of the cladding layer increases toward an end surface, wherein at least one of the optical waveguide layer and the cladding layer is formed from $Pb_{1-x}La_x(Zr_yTi_{1-y})_{1-x/4}O_3$ (0<x<0.3, 0<y<0).

22. An optical waveguide element comprising:

an optical waveguide layer having a ridge type channel optical waveguide; and a cladding layer provided above at least one of a light entering end portion and a light exiting end portion of the channel optical waveguide of a surface of the optical waveguide layer, the cladding layer having substantially the same width as the channel optical waveguide, and having a refractive index which is smaller than a refractive index of the optical waveguide layer, and having a tapered configuration in which a thickness of the cladding layer increases toward an end surface, wherein the optical waveguide layer is formed on a single crystal substrate via a buffer layer having a refractive index which is smaller than a refractive index of the optical waveguide layer, and wherein the single crystal substrate is formed by an $SrTiO_3$ substrate doped with an impurity element.

* * * * *